(12) United States Patent
Young et al.

(10) Patent No.: US 11,815,195 B1
(45) Date of Patent: Nov. 14, 2023

(54) WATER AND GAS UTILITY CONTROL SYSTEMS AND RETROFITTING KIT

(71) Applicant: WCM Industries, Inc., Colorado Springs, CO (US)

(72) Inventors: Gabriel Young, Colorado Springs, CO (US); William T. Ball, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 372 days.

(21) Appl. No.: 16/990,211

(22) Filed: Aug. 11, 2020

Related U.S. Application Data

(60) Provisional application No. 62/885,791, filed on Aug. 12, 2019.

(51) Int. Cl.
*F16K 37/00* (2006.01)

(52) U.S. Cl.
CPC ...... *F16K 37/0008* (2013.01); *F16K 37/0041* (2013.01); *F16K 37/0058* (2013.01)

(58) Field of Classification Search
CPC ............. F16K 37/0008; F16K 37/0041; F16K 37/0058
See application file for complete search history.

(56) References Cited

U.S. PATENT DOCUMENTS

| | | |
|---|---|---|
| 1,115,092 A | 10/1914 | Neahr |
| 1,145,764 A | 7/1915 | Fuller |
| 2,856,474 A | 10/1958 | Norris |
| 3,372,251 A * | 3/1968 | Bowman ............... H01H 27/06 200/43.08 |
| 3,417,212 A | 12/1968 | Driscoll |
| 3,543,096 A | 11/1970 | Bedford |
| 4,262,687 A | 4/1981 | Kobayashi |
| 4,263,928 A | 4/1981 | Kobayashi et al. |
| 4,519,657 A | 5/1985 | Jensen |
| 4,841,287 A | 6/1989 | Flig et al. |
| 4,957,273 A | 9/1990 | Sears |
| 5,126,934 A | 6/1992 | MacFadyen |
| 5,267,587 A | 12/1993 | Brown |
| 5,274,527 A | 12/1993 | Retzlaff |

(Continued)

FOREIGN PATENT DOCUMENTS

GB 2359891 9/2001

OTHER PUBLICATIONS

Flamefast Product Data Sheet, Flamefast Gasguard 1 Automatic Gas Proving System, Jun. 2003, 2 pages.

(Continued)

*Primary Examiner* — Angelisa L. Hicks

(57) ABSTRACT

A utility control system that includes a switch control unit for selectively controlling a utility. The switch control unit may include a visual indicator configured to illuminate a first color when a switch selection mechanism is in a first position to indicate the on state of the utility and a illuminate a second color when the switch selection mechanism is in a second position to indicate the off state of the utility. Control of the utility may be accomplished through generating low-voltage pulses that cause a latching solenoid to latch to a first state or a second state. The utility system may also be provided as a retrofitting kit for a light switch.

17 Claims, 21 Drawing Sheets

(56) References Cited

U.S. PATENT DOCUMENTS

| | | | |
|---|---|---|---|
| 5,305,781 A * | 4/1994 | Raymond, Jr. | H01H 19/623 |
| | | | 137/554 |
| 5,331,619 A | 7/1994 | Barnum et al. | |
| 5,440,477 A | 8/1995 | Rohrberg et al. | |
| 5,572,438 A | 11/1996 | Ehlers et al. | |
| 5,861,683 A | 1/1999 | Engel et al. | |
| 6,237,618 B1 | 5/2001 | Kushner | |
| 6,267,587 B1 | 7/2001 | Bishop et al. | |
| 6,757,589 B1 | 6/2004 | Parker et al. | |
| 6,775,593 B1 | 8/2004 | Parker et al. | |
| 6,990,393 B2 | 1/2006 | Parker | |
| 8,543,225 B2 | 9/2013 | Parker | |
| 9,546,742 B2 * | 1/2017 | Brown | F16K 37/0041 |
| 9,683,911 B2 | 6/2017 | Parker | |
| 10,162,321 B1 | 12/2018 | Parker | |
| 10,168,680 B1 | 1/2019 | Parker | |
| 10,509,380 B1 | 12/2019 | Parker | |
| 2002/0011949 A1 | 1/2002 | Rudow et al. | |
| 2005/0033479 A1 * | 2/2005 | Parker | F16K 37/0075 |
| | | | 700/282 |
| 2006/0020469 A1 | 1/2006 | Rast | |
| 2007/0053123 A1 | 3/2007 | Filippenko | |
| 2007/0220907 A1 | 9/2007 | Ehlers | |
| 2008/0091309 A1 | 4/2008 | Walker | |
| 2008/0115147 A1 | 5/2008 | Ding | |
| 2010/0164296 A1 | 7/2010 | Kurs | |
| 2010/0179670 A1 | 7/2010 | Forbes | |
| 2011/0004357 A1 | 1/2011 | Mathiowetz | |
| 2011/0093123 A1 | 4/2011 | Alexanian | |
| 2011/0178609 A1 | 7/2011 | Parker | |
| 2014/0096850 A1 * | 4/2014 | Filkovski | F16K 37/0041 |
| | | | 137/554 |
| 2015/0057765 A1 | 2/2015 | Parker | |
| 2016/0289929 A1 * | 10/2016 | Guy | G01M 3/2807 |
| 2018/0252888 A1 * | 9/2018 | Carapella | G02B 6/4454 |

OTHER PUBLICATIONS

Medem UK Products Brochure, Gas Pressure Proving System GPPS-plus, 9 pages, Jan. 11, 2002.

T.C.W. Services (Controls), LTD, Firewatch Brochure, Gas Supply Isolating And Pressure Drop Testing System, 34 pages, Jun. 8, 2001.

* cited by examiner

DLAv2-LVL

| Item # | Ref Des | Qty | Manufacturer | Mfg Part # | Comment |
|---|---|---|---|---|---|
| 1 | -_1, -_2, +_1, -_2, OFF, ON, PWR | 7 | Rohm Semiconductor | SML-D12U1WT86 | LED 0603 |
| 2 | 120V Input | 1 | On Shore Technology Inc. | OSTOQ037150 | 3 PIN JUMPER |
| 3 | Beacon Output | 1 | Wurth Electronics Inc. | 691137710002 | 1715022 |
| 4 | C1, C3, C5, C7, C9, C11, C12, C13, C14, C15, C18 | 11 | Samsung Electro-Mechanics | CL21A106KOQNNNG | 10uF |
| 5 | C2, C4, C10 | 3 | Murata Electronics | GRM033C80J104KE15D | 1uF |
| 6 | C6, C8, C16, C17 | 4 | Yageo | AC0603KPX7R9BB103 | 10nF |
| 7 | D3 | 1 | Diodes Incorporated | SBRT5A50SA-13 | DIODE SBR 50V 5A |
| 8 | D4, D5, D6, D7, D8, D9 | 6 | Panasonic Electronic Components | DZ2W15000L | Zener |
| 9 | PSU | 1 | MEAN WELL USA Inc. | IRM-60-12 | IRM-60 |
| 10 | PULSE OFF1, PULSE OFF2 | 2 | American Zettler | AZ946-2CH-12DE | Relay DPDT |
| 11 | Pulse_OUT | 1 | On Shore Technology Inc. | OSTOQ047150 | 4P, Connector |
| 12 | Q1, Q2 | 2 | ON Semiconductor | SMMBT3906WT1G | PNP |
| 13 | R1, R3, R6, R7, R8, R12, R17, R23, R25 | 9 | Yageo | RC0603FR-073KL | 3K |
| 14 | R9, R18 | 2 | Yageo | RC0603JR-071KL | 1K |
| 15 | R10, R11, R13, R14, R15, R16, R19, R20, R21, R22, R24, R26 | 12 | Yageo | AC0603FR-0749K9L | 49.9K |
| 16 | SSR1, SSR2 | 2 | Toshiba Semiconductor and Storage | TLP3543A(TP1,F | TLP3543A |
| 17 | Switch/LED | 1 | TE Connectivity AMP Connectors | 292207-6 | 292207-6 |
| 18 | TVS1, TVS2 | 2 | Vishay Semiconductor Diodes | SMAJ36CA-E3/5A | SMAJ36CA-E3/5A |
| 19 | U1, U2 | 2 | Texas Instruments | NE556DR | NE556DR |

FIG. 5I

DLAv2-LVL

| Item # | Ref Des | Description / Value |
|---|---|---|
| 1 | -_1, -_2, +_1, -_2, OFF, ON, PWR | Red 620nm LED Indication - Discrete 2.2V 0603 (1608 Metric) |
| 2 | 120V Input | 3 Position Terminal Block Header, Male Pins, Shrouded 0.197" (5.00mm) Vertical Through Hole |
| 3 | Beacon Output | 2 Position Wire to Board Terminal Block Horizontal with Board 0.197" (5.00mm) Through Hole |
| 4 | C1, C3, C5, C7, C9, C11, C12, C13, C14, C15, C18 | 10µF ± 10% 16V Ceramic Capacitor X5R 0805 (2012 Metric) |
| 5 | C2, C4, C10 | CAP 1uF 16V ±5% 0603 (1608 Metric) Thickness 1mm SMD |
| 6 | C6, C8, C16, C17 | Ceramic Capacitor 0603 (1608 Metric) |
| 7 | D3 | Diode Super Barrier 50V 5A Surface Mount |
| 8 | D4, D5, D6, D7, D8, D9 | Zener Diode 15V 1W ±5% Surface Mount Mini2-F3-B |
| 9 | PSU | Enclosed AC DC Converter 1 Output 12V 5A 85 ~ 264 VAC Input |
| 10 | PULSE OFF1, PULSE OFF2 | AZ946-2CH-12DE, DPDT Relay American Zettler |
| 11 | Pulse_OUT | 4 position Terminal Block Header, Male Pins, Shrouded (4 side) 0.197" (5.00mm) Vertical Solder |
| 12 | Q1, Q2 | Bipolar (BJT) Transistor PNP 40V 200mA 250MHz 150mW |
| 13 | R1, R3, R6, R7, R8, R12, R17, R23, R25 | Resistor, 5%, 0603, SMD |
| 14 | R9, R18 | Resistor, 5%, 0603, SMD |
| 15 | R10, R11, R13, R14, R15, R16, R19, R20, R21, R22, R24, R26 | Resistor, 5%, 0603, SMD |
| 16 | SSR1, SSR2 | 1 Form A Solid State Relay, 2 A, -40 to 85 degC, 6-Pin SMD, RoHS, Tape and Reel |
| 17 | Switch/LED | Connector Header Through Hole 6 Position 0.059" (1.50mm) |
| 18 | TVS1, TVS2 | Transient Voltage Suppressor, 6.40 to 231 V, 36 V Stand-off Voltage, Bi-Directional, -55 to 155 degC, 2-pin |
| 19 | U1, U2 | 555 Type, Timer/Oscillator (Dual) IC 100kHz 14-SOIC |

FIG. 5I (Cont.)

WATER AND GAS UTILITY CONTROL SYSTEMS AND RETROFITTING KIT

RELATED APPLICATION

This application claims the benefit of U.S. Provisional Application No. 62/885,791, filed Aug. 12, 2019, and titled Water and Gas Utility Control Systems and Retrofitting Kit, the entirety of which is incorporated herein by reference.

BACKGROUND

Control of utilities, such as water and gas, is often desired for safety concerns and preventing waste, among other concerns. For example, during drug testing procedures, it may be desirable to turn off the water supply to the restroom where the sample is collected. By turning off the water supply to the restroom, the sample is less likely to be diluted by the person undergoing drug testing. In another example, remote control of gas flow to an appliance, such as a grill, may be desired. Control of such utilities in a laboratory environment may also be desired.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

The present technology relates to remotely controlling utilities, such as gas or water. In an aspect, the technology relates to a utility control system that includes a switch control unit for selectively controlling a utility. The switch control unit includes a switch selection mechanism for selectively controlling when a utility is in an on state and an off state; and a visual indicator. The visual indicator is configured to illuminate a first color when the switch selection mechanism is in a first position to indicate the on state of the utility and a illuminate a second color when the switch selection mechanism is in a second position to indicate the off state of the utility. In an example, the utility is one of water or gas. In another example, the visual indicator is a ring and is concentric with the switch selection mechanism. In yet another example, the first color is green and the second color is red.

In another aspect, the utility control system relates to a utility control system that includes a switch control unit for selectively controlling a utility. The switch control unit includes a switch selection mechanism for selectively controlling when a utility is in an on state and an off state; and a visual indicator, wherein the visual indicator is configured to illuminate different colors. The system also includes control circuitry configured to: send signals to a valve to control the state of the utility; receive signals from the valve; cause the visual indicator to illuminate a first color when the switch selection mechanism is in a first position to indicate the on state of the utility and an open limit switch signal is received from the valve; and cause the visual indicator to illuminate a second color when the switch selection mechanism is in a second position to indicate the off state of the utility and a closed limit switch signal is received from the valve.

In an example, visual indicator is a ring and is concentric with the switch selection mechanism. In another example, the switch selection mechanism is a key. In yet another example, the control circuitry is further configured to cause the visual indicator to display an opening indication when the switch selection mechanism is in the first position and the open limit switch signal has not been received within an open time delay period. In still another example, the control circuitry is further configured to cause the visual indicator to display a closing indication when the switch selection mechanism is in the second position and the closed limit switch signal has not been received within a close time delay period. In a further example, the control circuitry is further configured to cause the visual indicator to display an error indication when the switch selection mechanism is in the first position and the open limit switch signal has not been received after a conclusion of an open time delay period. In still yet another example, the control circuitry is further configured to cause the visual indicator to display an error indication when the switch selection mechanism is in the second position and the closed limit switch signal has not been received after a conclusion of a close time delay period. In another example, the error indication is an alternating illumination of the first color and the second color.

In another aspect, the technology relates to a method for controlling a utility. The method includes determining a switch selection mechanism of a utility control system is in a first position to indicate an on state of the utility; receiving an open limit switch signal from a valve of the utility; based on the switch selection mechanism being in the first position and receiving the open limit switch signal, illuminating a visual indicator, of the utility control system, with a first color; subsequent to a movement of the switch selection mechanism, determining that the switch selection mechanism is in a second position to indicate an off state of the utility; receiving a closed limit switch signal from the valve; and based on the switch selection mechanism being in the second position and receiving the closed limit switch signal, illuminating the visual indicator with a second color.

In another aspect, the technology relates to a retrofitting kit for installing a utility control system. The retrofitting kit may include an enclosure box having control circuitry for controlling at least one utility and predrilled holes corresponding to at least one of a single-gang box or a multi-gang box, a cover plate having a key switch, at least one key for the key switch, and a set of fasteners for attaching the cover plate to the enclosure box. In an example, the retrofitting kit further includes at least one solenoid configured to be controlled by the control circuitry of the enclosure box.

In another aspect, the technology relates to a method for retrofitting a light switch with a utility control system. The method includes removing a light switch and a light switch cover from a single-gang box or a multi-gang box, attaching an enclosure box of a utility control system to the single-gang box or the multi-gang box through predrilled holes or identified markings that align with the single-gang box or the multi-gang box, attaching wiring from an output terminal of the enclosure box to at least one solenoid to establish a connection between control circuitry of the enclosure box and the at least one solenoid, attaching high-voltage wiring from the single-gang box or multi-gang box to an input terminal of the enclosure box; and attaching a cover plate having a switch control unit to the enclosure box. In an example, the method further includes, prior to attaching the cover plate, connecting wiring from the switch control unit to the enclosure box. In an example, the wiring from an output terminal of the enclosure box to the at least one solenoid is low-voltage wiring. In another example, a ratio of the length of the low-voltage wiring to the length of high-voltage wiring is at least 100:1.

In another aspect, the technology relates to a system for remotely controlling a latching solenoid with low-voltage pulses. The system includes an AC/DC converter configured to convert high-voltage AC power to a low-voltage DC power; a switch configured to select whether a utility is on or off; a first resistor-capacitor (RC) filter configured to output an enable trigger signal when the switch is turned to a first position; a second RC filter configured to output a disable trigger signal when the switch is in a second position; and a first timer integrated circuit, powered by the low-voltage DC power The timer may be configured to receive the enable trigger signal at a first trigger input; receive the disable trigger signal at a second trigger input; in response to receiving the enable trigger signal, generate a enable pulse; and in response to receiving the disable trigger signal, generate a disable pulse. The system may also include a first relay including a first input to receive the enable pulse, a second input to receive the enable pulse, a first output connected to a positive output terminal, and a second output connected to a negative output terminal. The relay may be configured to, when the enable pulse is present on the first input, pass the enable pulse from the first input to the first output and connect the second output to ground such that a positive voltage difference is provided between the positive output terminal and negative output terminal for a duration of the enable pulse; and when the disable pulse is present on the second input, pass the disable pulse from the second input to the second output and connect the first output to ground such that a positive voltage difference is provided between the negative output terminal and the positive output terminal for a duration of the disable pulse. In an example, the enable trigger signal is a ground pulse and the disable trigger signal is a ground pulse. In another example, the timer integrated circuit includes at least one 555 timer. In yet another example, the positive output terminal is connected to a first input of a solenoid configured to control the flow of gas or water and the negative output terminal is connected to a second input of the solenoid. In still another example, the enable pulse causes the solenoid to latch to a first state. In still yet another example, the disable pulse causes the solenoid to latch to a second state.

In another example, the system further includes a second relay configured to receive the enable pulse and generate a positive pulse, wherein the enable pulse received by the first relay is the positive pulse. In still another example, the second relay is a solid-state relay. In yet another example, the first relay is a mechanical relay. In a further example, the system may also include a third RC filter configured to generate a second enable trigger signal from the enable pulse; a fourth RC filter configured to generate a second disable trigger signal from the disable pulse; and a second timer integrated circuit, powered by the low-voltage DC power. The second timer integrated circuit may be configured to receive the second enable trigger signal at a first trigger input; receive the second disable trigger signal at a second trigger input; in response to receiving the second enable trigger signal, generate a second enable pulse; and in response to receiving the second disable trigger signal, generate a second disable pulse.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 5I depicts a table showing example circuit component values of the low-voltage circuitry of FIG. 5A.

DETAILED DESCRIPTION

Remote control of a utility, such as water or gas, is desirable in many situations, as discussed above. Installation and control of remote control systems, however, continues to be a challenge. For instance, access to power must be available for both the remote control of the utility and to control of the utility, such as a solenoid, that physically opens or closes a valve. Such power requirements necessitate either separate power supplies at the remote control panel and the solenoid, or power must to be transferred from remote control panel to the solenoid. Running high voltage lines long distances within a building, however, may require certain building codes and regulations to be met, which introduces additional difficulties in installing such remote control panels. In addition, continuous power to solenoids may cause excess heat at the valve. Such heat can cause calcifications within the plumbing that reduces water flow.

The present technology provides for improved remote control of utilities, such as water and gas, in light of at least the above considerations. For example, the present technology provides for a retrofitting kit for a light switch that may be used to convert a light switch into a remote utility control system. The retrofitting kit resolves the issues of accessing high voltage for the remote utility control system as light switches generally are placed at locations where high voltage has already been wired within the building. In addition, the present technology also provides for low power (e.g., 12 VDC) control of the solenoids from the remote utility control system. As an example, the high voltage source (such as building power) powers the remote control system which converts the high-voltage AC power to low-voltage DC power. The low-voltage wiring from the remote utility control system may then be extended through the building to the solenoid. Accordingly, the length of new high voltage wiring, if any, may be significantly less than the length of new low voltage wiring. The use of low voltage wiring reduces risk of running high voltage wires through walls and avoids building codes and regulations relating high voltage installations. The present technology also provides for the use of latching solenoids controlled by a low-voltage pulse. The use of latching solenoids and pulse control reduces the power consumption of the system as a whole and also reduces the amount of heat generated by the solenoid. Additional improvements and features of the present technology will also be appreciated in light of the discussion provided herein.

Figure 1B:
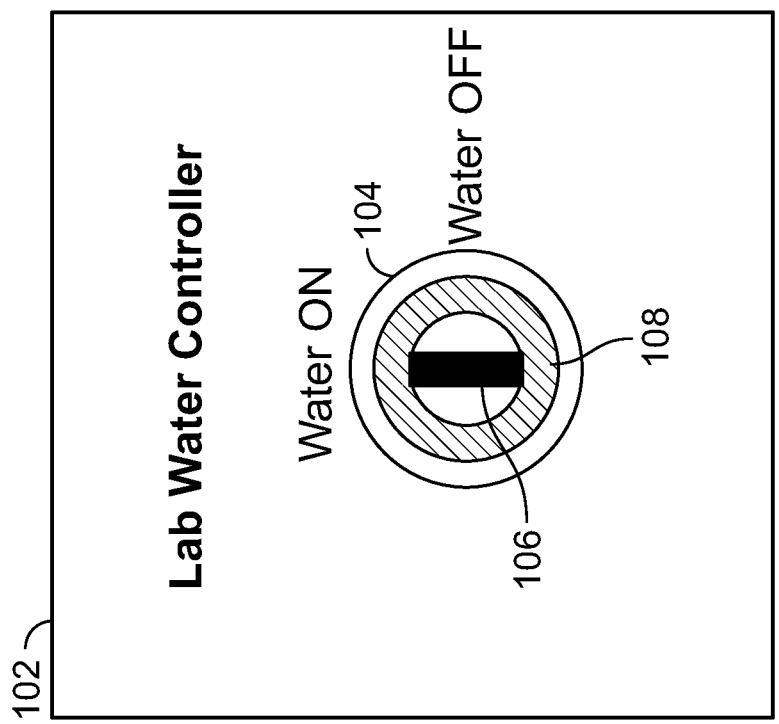
FIG. 1B depicts a front view of an example remote utility control system in an off position.
Figure 1A:
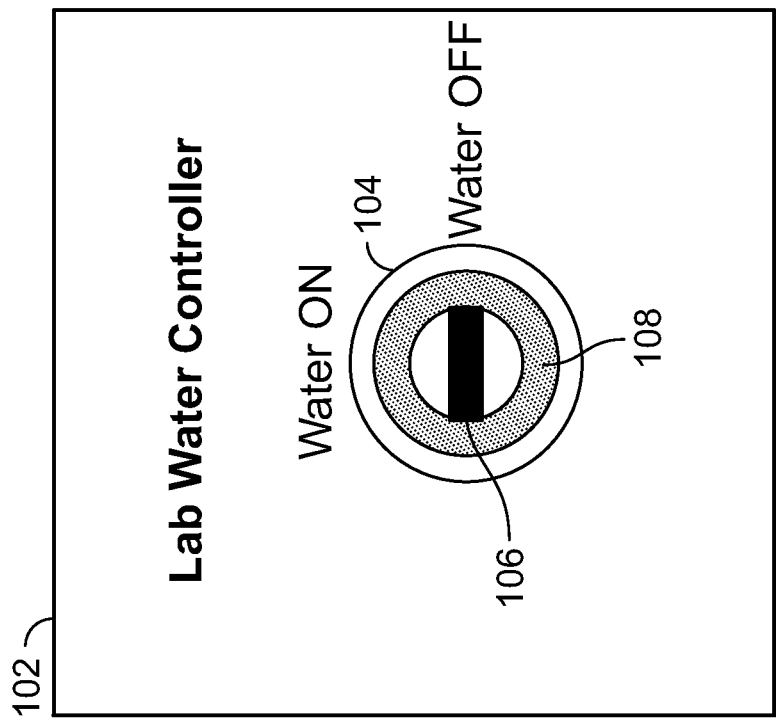
FIG. 1A depicts a front view of an example remote utility control system in an on position.

FIG. 1A depicts a front view of an example remote utility control system 102 in an on position. The remote utility control system 102 includes a switch control unit 104. The switch control unit 104 includes a visual indicator 108 and a switch selection mechanism 106. The switch selection mechanism 106 in the example depicted in FIG. 1A is a key and the switch control unit 104 is a key switch. The key may be turned to select either the "Water ON" state or the "Water OFF" state. In other examples, switch control unit 104 may be a toggle switch, a push button switch, a touch-sensor switch, or other types of switches. In FIG. 1A, the key has been turned to the "Water ON" position. In the "Water ON" position, the remote utility control system 102 causes a solenoid to open to allow for water to flow through a valve, which allows for water to be provided to a desired area, such as a restroom. Other types of valves, such as ball valves, may also be controlled. In addition, when the key has been turned to the "Water ON" position, the visual indicator 108 illuminates in a first color, such as green to indicate that the water is in an on state.

FIG. 1B depicts a front view of an example remote utility control system 102 in an off position. In FIG. 1B, the key is in the "Water OFF" position. In the "Water OFF" position, the remote utility control system 102 causes the solenoid to close to prevent water from flowing through a valve, which prevents water from being available in the desired area, such as the restroom. In addition, when the key has been turned to the "Water OFF" position, the visual indicator 108 illuminates a second color, such as red to indicate that the water is in an off state. Accordingly, a user is able to readily assess, even from a distance, whether the water is on or off by looking at the illumination color of visual indicator 108.

The visual indicator 108 may include first illumination source that emits the first color of light and a second illumination source that emits the second color of light. For example, the visual indicator 108 may include a green LED that illuminates when the key is in the "Water ON" position and a red LED that illuminates when the key is the in "Water OFF" position. Both LEDs may located in the same housing of the visual indicator 108 such that the visual indicator 108 appears as a single light source that changes color. In the example depicted, the visual indicator 108 is in the shape of a ring in the switch control unit 104. The ring may have a center that is also the center of the switch control unit 104. For instance, the visual indicator 108 may be concentric with the switch selection mechanism 106.

While the remote utility control system 102 is discussed primarily as controlling water, in other examples the remote utility control system 102 may control a gas utility. In further examples, multiple switch control units 104 may be incorporated into the remote utility control system 102. A first switch control unit 104 may be used to control a first utility, such as water, and a second switch control unit 104 may be used to control a second utility, such as gas. In other examples, multiple switch control units 104 may be incorporated to control different valves of the same utility. For example, each water valve may include a solenoid that may be separately controlled by a switch control unit 104. Such an implementation may be used to control water in different rooms or stalls, among other useful implementations.

The status of the visual indicator 108 may also be based on additional information received from the valve that is being controlled by the remove utility control system. As an example, feedback from the valve may be received that indicates whether the valve is actually in an open or a closed position, and thus, whether the utility is in an on state or an off state. For instance, some valves, such as ball valves, may include limit switches that indicate when the valve is in an open position or a closed position. When the valve moves to the closed position, the valve contacts the closed limit switch, which generates a closed-limit-switch signal indicating the valve is in the closed position or state. Similarly, when the valve moves to the open position, the valve contacts the open limit switch, which generates an open-limit-switch signal indicating that the valve is in the open position or state. The signals from the limit switches may be used to confirm that the selected state (e.g., "Water On") has been achieved. An example process for using such signals is discussed below with reference to FIG. 1C.

Figure 1C:
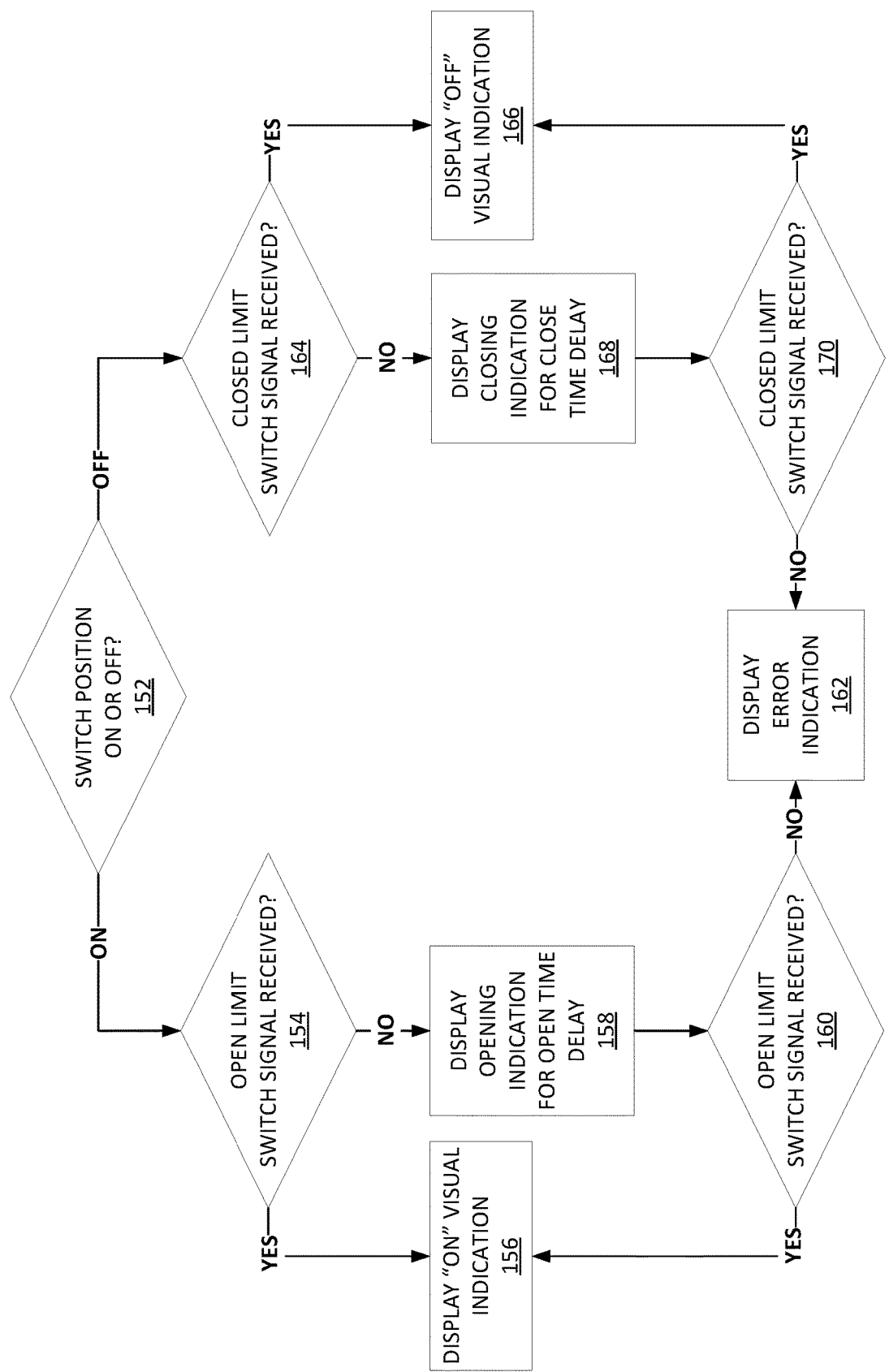
FIG. 1C depicts an example method for controlling an indicator of a remote utility control system.

FIG. 1C depicts an example method 150 for controlling an indicator of a remote utility control system. Method 150 may be performed by a remote utility control system that includes a processor or similar device and memory storing instructions to perform the operations of method 150. The operations may also be performed or achieved with a series of logic gates or similar implementations. The processor(s), memory, and/or logic gates may form a part of control circuitry in the utility control system for controlling a valve of the utility. Method 150 may begin upon a power up the remote utility control system and/or when a switch is changed from one state to another, such as from an on position to an off position or vice versa. At operation 152, a determination is made as to whether the switch, such as switch control unit, is in the on position or the off position. If the switch is in the on position, the method 150 flows to operation 154 where a determination is made as to whether an open limit switch signal has been received from the valve being controlled. The open limit switch signal is a signal from a limit switch of the valve that indicates the valve is in an open state. If the open limit switch has been received, the method 150 flows to operation 156 where an "ON" visual indication is displayed. For example, the "ON" visual indication may be an illumination of the visual indictor 108 in a first color, such as green.

If, at operation 154, the open limit switch signal has not been received, the method 154 flows to operation 158. At operation 158, an opening indication is displayed. The opening indication indicates that the valve is in the process of opening. The opening indication may be a flashing illumination of the visual indicator in the same color as the "ON" visual indication. For example, the opening indication may be a flashing green illumination of the visual indicator. With some valves, such as ball valves, the valve may take some amount of time to open (i.e., move from the closed position to the open position). Accordingly, when the switch is moved from an off to an on position to open the valve, the valve begins to open, but may not be fully open immediately. The opening indication may be displayed during this time to indicate to the user that the valve is currently opening but is not yet fully open. The opening indication may be displayed for an open time delay. The open time delay may be the amount of time that the valve requires for moving from a closed position to an open position. The open time delay may be determined or calibrated by measuring the time from which the switch is turned to the on position until the open limit switch signal is received when the valve is operating properly. The opening indication may be displayed for the duration of the open time delay. In other examples, the opening indication may cease to be displayed upon receipt of the open limit switch signal if the open limit switch signal is received prior to expiration of the open time delay period.

At the conclusion of open time delay period, a determination if the open limit switch signal has been received is again made at operation 160. As discussed above, when the valve is operating correctly, the valve should move from the closed position to the open position within the open time delay period. If the valve does not open within that time frame, an error may have occurred. Accordingly, if the open limit switch signal is determined to have been received at operation 160, method 150 flows to operation 156 where the "ON" visual indication is displayed. If, however, the open limit switch signal is determined to have not been received at operation 160, method 150 flows to operation 162 where an error indication is displayed. The error indication may be displayed via an illumination of the visual indicator. The error indication may be an illumination of a third color, a different rate of flashing illumination, and/or an alternation of two colors in the visual indicator. The error indication indicates to the user that the valve may be malfunctioning.

Returning to operation 152, if the switch position is in the off position, the method 150 flows to operation 164 where a determination is made as to whether a closed limit switch signal has been received from the valve being controlled. The closed limit switch signal is a signal from a limit switch of the valve that indicates the valve is in a closed state. If the closed limit switch signal has been received, the method 150 flows to operation 166 where an "OFF" visual indication is displayed. For example, the "OFF" visual indication may be an illumination of the visual indictor 108 in a second color, such as red.

If, at operation 154, the closed limit switch signal has not been received, the method 154 flows to operation 168. At operation 168, a closing indication is displayed. The closing indication indicates that the valve is in the process of closing. The closing indication may be a flashing illumination of the visual indicator in the same color as the "OFF" visual indication. For example, the closing indication may be a flashing red illumination of the visual indicator. With some valves, such as ball valves, the valve may take some amount of time to close (i.e., move from the open position to the closed position). Accordingly, when the switch is moved from an on position to an off position to close the valve, the valve begins to close, but may not be fully closed immediately. The closing indication may be displayed during this time to indicate to the user that the valve is currently closing but is not yet fully closed. The closing indication may be displayed for a close time delay. The close time delay may be the amount of time that the valve requires for moving from an open position to a closed position. The close time delay may be determined or calibrated by measuring the time from which the switch is turned to the off position until the closed limit switch signal is received when the valve is operating properly. The closing indication may be displayed for the duration of the close time delay. In other examples, the closing indication may cease to be displayed upon receipt of the close limit switch signal if the close limit switch signal is received prior to expiration of the close time delay period.

At the conclusion of close time delay period, a determination if the closed limit switch signal has been received is again made at operation 170. As discussed above, when the valve is operating correctly, the valve should move from the open position to the closed position within the close time delay period. If the valve does not close within that time frame, an error may have occurred. Accordingly, if the close limit switch signal is determined to have been received at operation 170, method 150 flows to operation 166 where the "OFF" visual indication is displayed. If, however, the close limit switch signal is determined to have not been received at operation 170, method 150 flows to operation 162 where an error indication is displayed. The error indication may be displayed via an illumination of the visual indicator. The error indication may be an illumination of a third color, a different rate of flashing illumination, and/or an alternation of two colors in the visual indicator. For example, the error indication may be an alternating red and green illumination of a visual indicator. The error indication indicates to the user that the valve may be malfunctioning.

Figure 2A:
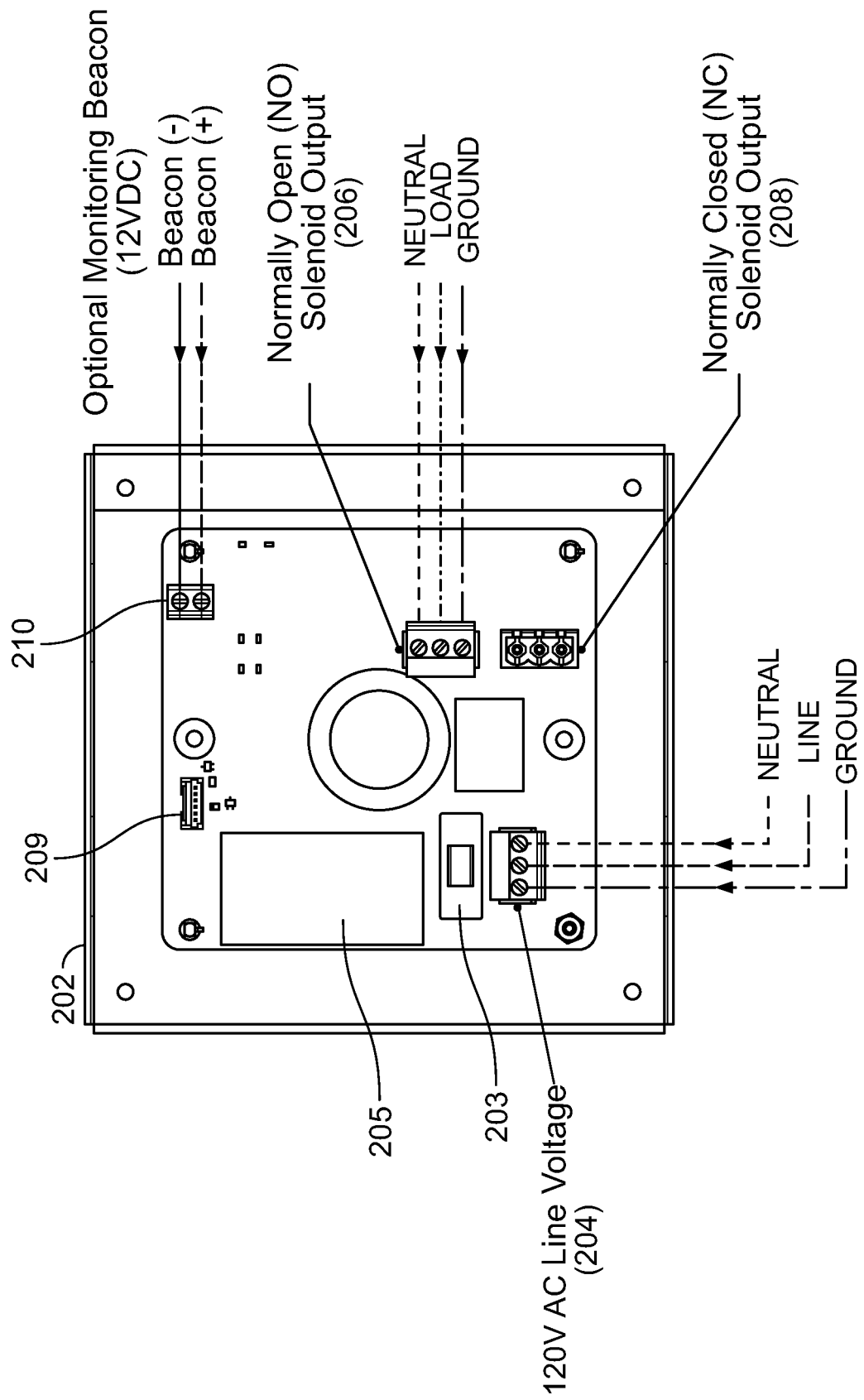
FIG. 2A depicts an interior view of a high-voltage utility control system.

FIG. 2A depicts an interior view of a high-voltage utility control system 202. The high-voltage utility control system 202 includes an input terminal block 204 that can be wired with input power. The input terminal block 204 may be wired as depicted in FIG. 2A, with a ground, neutral, and line/hot wire. Such input power and wiring may come from a retrofitted light switch as discussed herein. The high-voltage input power may be 120 VAC at 60 Hz. High voltage as used herein may refer to any voltage from about 85 V and above, including at least 120 V and 220 V. The high-voltage utility control system 202 may also include a fuse 203. The fuse may be a 120V, 2 Amp fuse. Thus, if a current of greater than 2 Amps is drawn through the high-voltage utility control system 202, the fuse 203 is tripped to prevent potentially dangerous amounts of current at a high voltage. The high-voltage utility control system 202 also includes control circuitry 205 for controlling power output to the solenoids.

The high-voltage utility control system 202 may also include a first output terminal block 206 for a normally open solenoid and a second output terminal block 208 for a normally closed solenoid. The output terminals may be wired as shown in FIG. 2A. Either the first output terminal block 206 or the second output terminal block 208 may be wired depending on the type of solenoid that is being used to control the valve for the utility, such as gas or water. In some examples where water is intended to be on or flowing the majority of the time, normally open solenoids are preferred as they will only be powered when the water is to shut off. In examples where water is intended to be off the majority of the time, normally closed solenoids are recommended as they will only be powered when the water is turned on. The output power may be limited to 240 Watts where the input power is 120 VAC and the fuse 203 is a 2 Amp fuse.

A beacon output terminal block 210 may also be included for providing power to an optional beacon that indicates whether the water is on or off. In some examples, the beacon may operate on a low voltage, such as 12 VDC. In such examples, the high-voltage control circuitry 205 may include an AC/DC converter that converts the 120 VAC input into a 12 VDC output. The high-voltage control circuitry 205 provides output power to the solenoid and beacon based on the position of a switch, such as the switch control unit 104 in FIGS. 1A-B above. For instance, power may be provided to the beacon when the water is off and the switch is in the off position. The beacon may be a light or other illumination device. In addition, the beacon may be a display, such as an LED display, that displays information including words and/or numbers to indicate whether the utility is in an on or off position. A switch plug 209 may also be included in the high-voltage utility control system 202. The switch plug 209 receives wiring from the switch control unit 104 such that the switch control unit 104 may be electrically connected to the control circuitry 205.

Figure 2B:
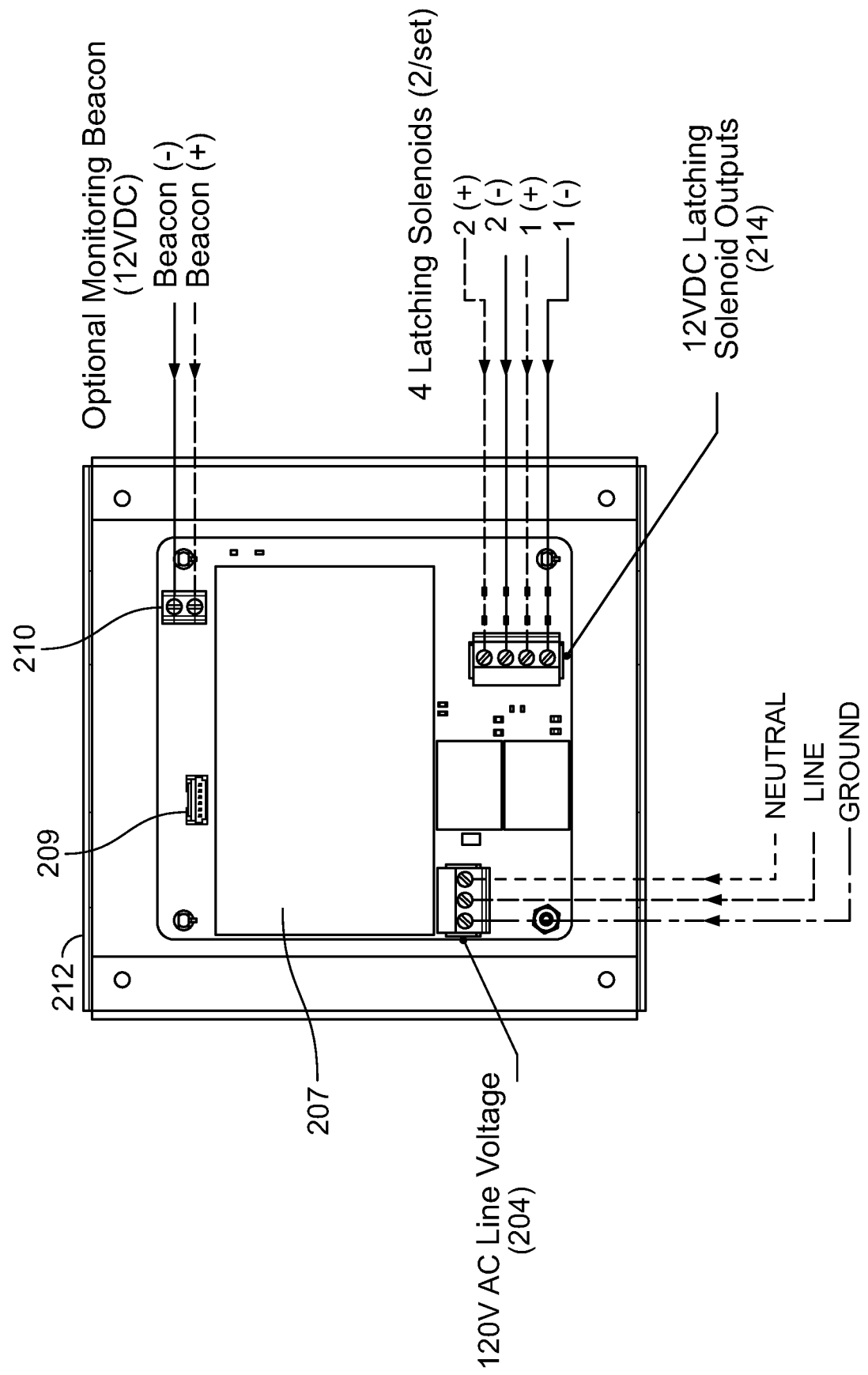
FIG. 2B depicts an interior view of a low-voltage utility control system.

FIG. 2B depicts an interior view of a low-voltage utility control system 212. Similar to the high-voltage utility control system 202, the low-voltage utility control system 212 includes a input terminal block 204 that is wired as shown in FIG. 2B. The low-voltage utility control system 212 also includes a beacon output terminal block 210 and a switch plug 209. The low-voltage utility control system 212 further includes low-voltage control circuitry 207. The low-voltage control circuitry 207 generates a low-voltage pulse that controls at least one latching solenoid. An example of the low-voltage control circuitry 207 is discussed in further detail below with reference to FIGS. 5A-5I. The low-voltage pulse(s) generated from the low-voltage control circuitry 207 are provided to the latching solenoid(s) via a low-voltage output terminal block 214. The low-voltage output terminal block 214 may be wired as depicted in FIG. 2B. For instance, the terminal block 214 may include a first positive output and a first negative output that may be wired to a first latching solenoid. The terminal block 214 may also include a second positive output and a second negative output that may be wired to a second solenoid. In some examples, additional solenoids may be controlled, and the low-voltage output terminal block 214 may be expanded to accommodate additional solenoids.

Figure 3A:
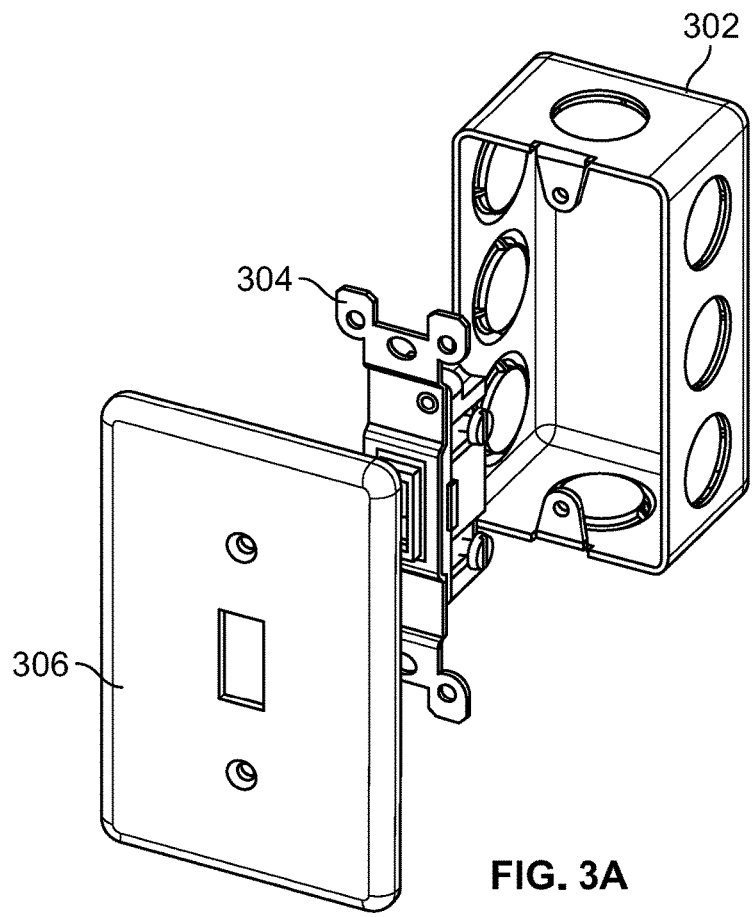
FIG. 3A depicts a step of removing a light switch.

FIGS. 3A-3D illustrate steps for retrofitting a light switch with a remote utility control system. FIG. 3A depicts a step of removing a light switch. During that step, the light switch 304 and the light switch cover 306 are removed from the wall and the single-gang box 302. The single-gang box 302 is generally located within a wall and affixed to an interior structure, such as a stud. The single-gang box 302 remains in the wall in its affixed position. While a single-gang box 302 is used herein as an example, multi-gang boxes may also be used and retrofitted using the technology discussed herein.

Figure 3B:
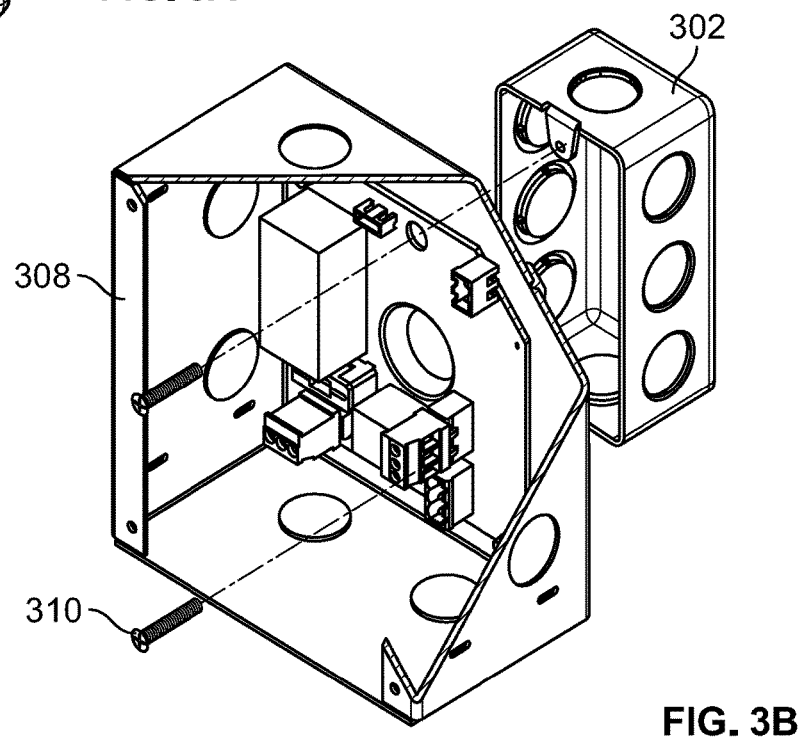
FIG. 3B depicts a step of installing an enclosure box of a remote utility control system.

FIG. 3B depicts a step of installing an enclosure box 308 of a remote utility control system. The enclosure box 308 may include the features of the high-voltage utility control system 202 and/or low-voltage utility control system 212 discussed above with reference to FIGS. 2A-2B. The enclosure box 308 may be attached to the single-gang box 302 with fasteners 310, such as screws. The enclosure box 308 may include markings or pre-drilled holes that align with the standard hold locations of the single-gang box 302. Thus, the enclosure box 308 may be mounted to the single-gang box 302 using similar connections as the light switch cover 306. In some examples, the screws from removal of the light switch cover may be used as the fasteners 310. Once the enclosure box 308 has been attached to the single-gang box 302, power may be connected to the enclosure box 308 as shown in FIGS. 2A-2B. For instance, the wires that previously were attached to the light switch 304 may then be attached to the input terminal block 204 of the enclosure box 308. Wiring from the enclosure box 308 to the solenoids may also be installed. In some examples, the high-voltage wiring from the single-gang box 302 to the enclosure box 308 may be a few inches, whereas the wiring from the enclosure box 308 to the solenoids may be hundreds of feet. Where the enclosure box 308 provides for low-voltage control, the extra length of the wiring to solenoids no longer requires additional compliance with building codes or regulations. In some examples, the ratio of the length of the low-voltage wiring to the length of high-voltage wiring may be at least 100:1. The length of the high-voltage wiring is measured from the interior of the single-gang or multi-gang box to the input terminal of the enclosure box 308, and the length of the low-voltage wiring is measured from the output terminal of the enclosure box 308 to the solenoid.

Figure 3C:
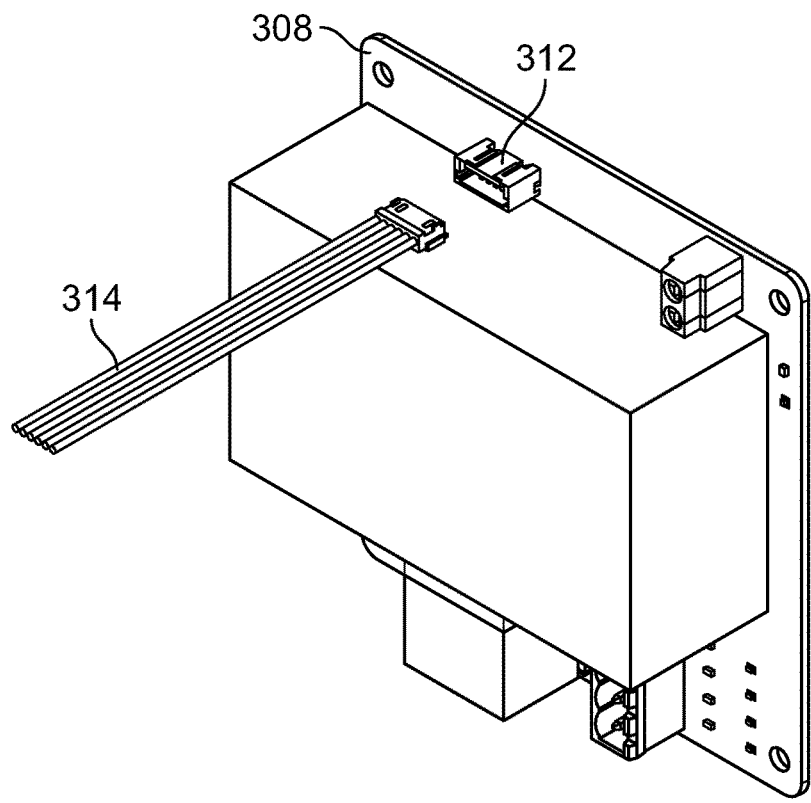
FIG. 3C depicts a step of connecting the switch control unit to the enclosure box.
Figure 3D:
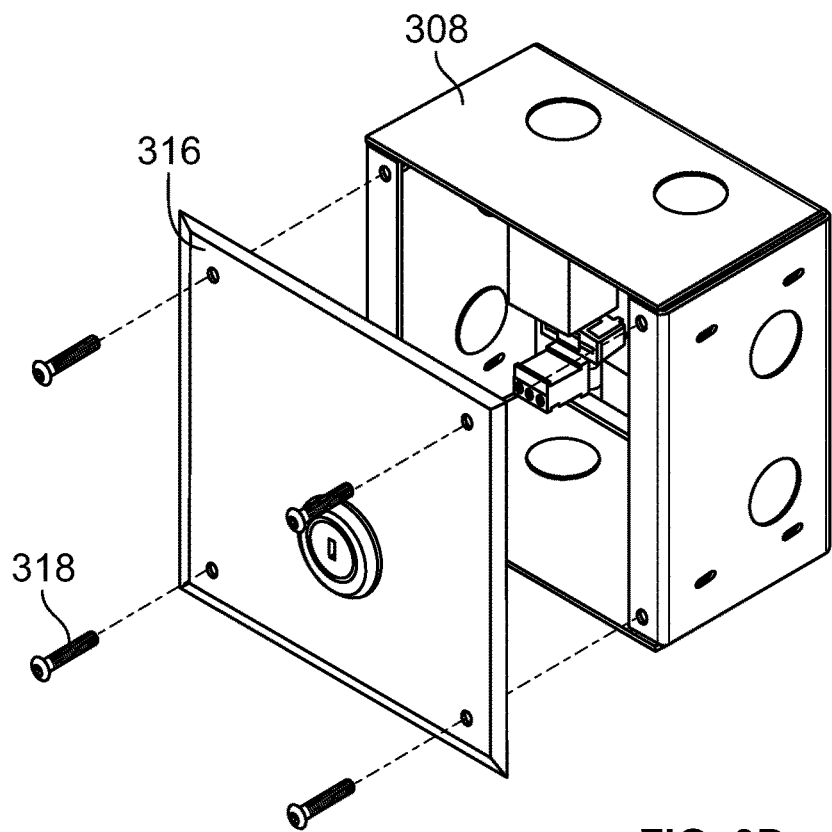
FIG. 3D depicts a step of attached the cover plate to the enclosure box.

FIG. 3C depicts a step of connecting the switch control unit to the enclosure box 308. The switch wiring 314 may be plugged into the switch plug 312 of the enclosure box 308. The switch plug 209 receives wiring from the switch control unit of cover plate, such that the switch control unit may be electrically connected to the control circuitry of the enclosure box 308. FIG. 3D depicts a step of attached the cover plate 316 to the enclosure box 308 with fasteners 318, such as screws. The cover plate 316 may include the features of the example remote utility control system 102 described above and depicted in FIGS. 1A-1B.

The components described above may be included in a retrofitting kit for replacing a light switch with the utility control system. For instance, the retrofitting kit may include an enclosure box 308 with predrilled holes corresponding to a single-gang box 320 or a multi-gang box, or both. The retrofitting kit may also include a cover plate 316. If the switch on the cover plate 316 is a key switch, the retrofitting kit may also include the corresponding key for the key switch.

In other examples, the retrofitting kit may be configured to replace a single switch in multi-switch or multi-gang switch configuration. For example, in a multi-gang box having multiple light switches, the utility-controlling switch of the present technology may be made configured and/or sized to replace a single light switch of the multiple light switches.

Figure 4A:
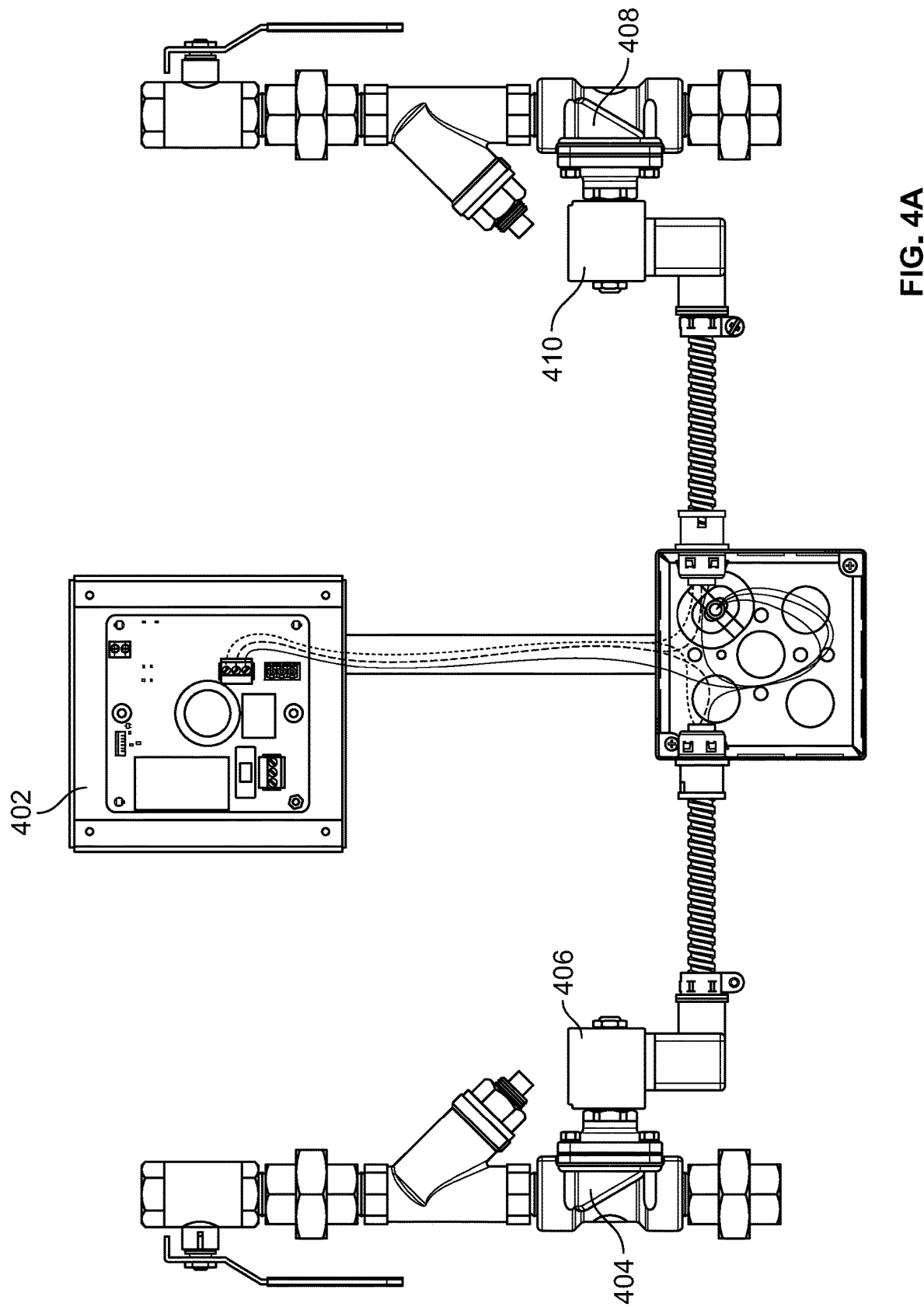
FIG. 4A depicts an example connection configuration for a high-voltage utility control system.

FIG. 4A depicts an example connection configuration for a high-voltage utility control system 402. The high-voltage utility control system 402 may be the high-voltage utility control system 202 described above and depicted in FIG. 2A. The output wires from the high-voltage utility control system 402 may be split in two and fed to separate solenoids on two valves. For instance, the output wiring may be connected to a first solenoid 406 of a first valve 404. The output wiring may also be connected to a second solenoid 410 of a second valve 408. Accordingly, the high-voltage utility control system 402 is able to control the flow of water or gas through both the first valve 404 and the second valve 408. As depicted, the wiring may also be fed through additional conduit and at least one junction box prior to being connected to the first solenoid 406 and the second solenoid 410.

Figure 4B:
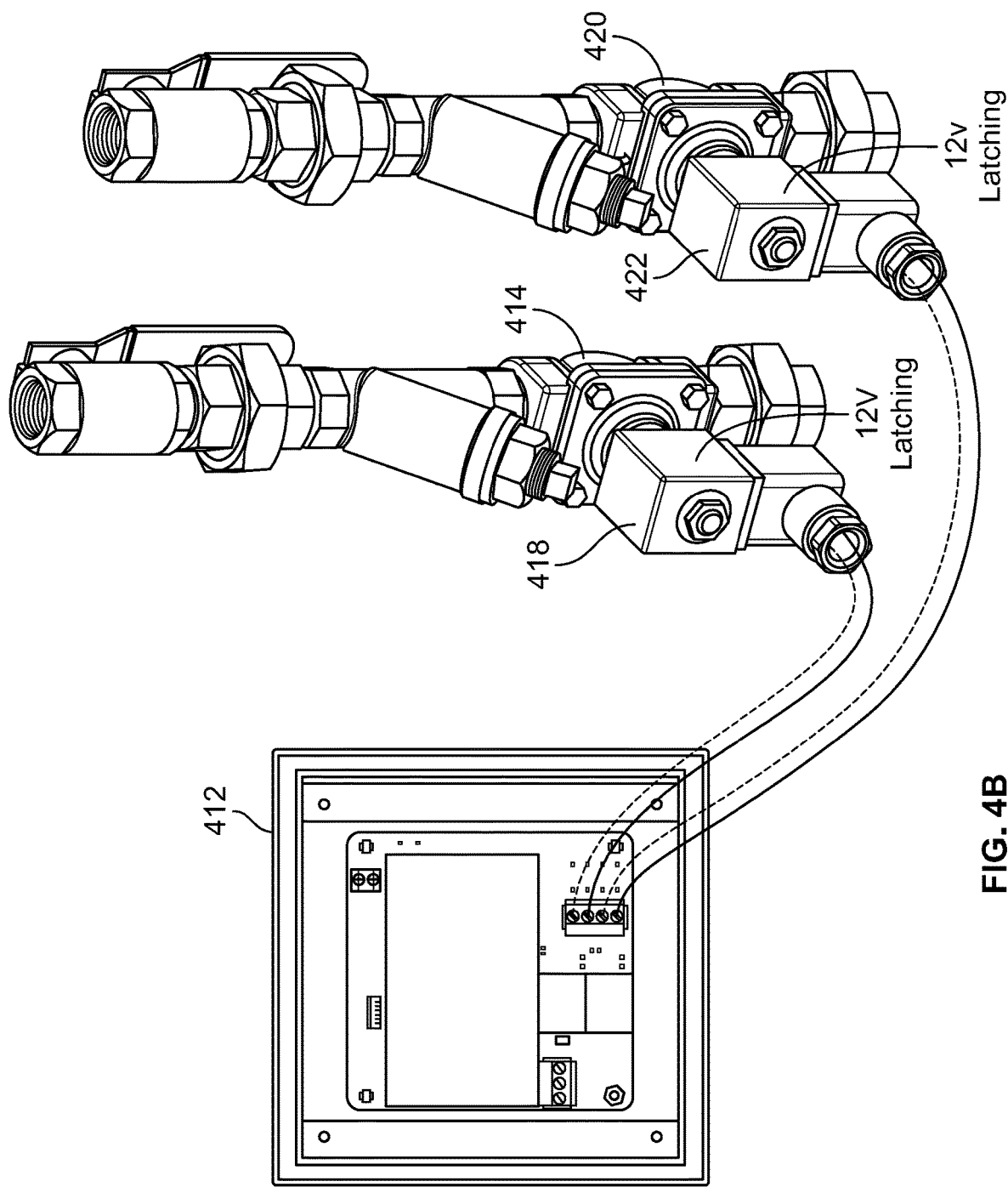
FIG. 4B depicts an example connection configuration for a low-voltage utility control system.

FIG. 4B depicts an example connection configuration for a low-voltage utility control system 412. The low-voltage utility control system 412 may be the low-voltage utility control system 212 discussed above and depicted in FIG. 2B. The low-voltage utility control system 412 includes low-voltage outputs to two latching solenoids. In particular, a first pair of wires is attached to a first solenoid 418 of a first valve 414 and a second pair of wires is attached to a second solenoid 422 of a second valve 420. The first valve 414 may be for a hot-water line and the second valve 420 may be for a cold-water line. Thus, the same pulse can turn off or on both hot and cold water. For instance, when a pulse of a first polarity is provided to the solenoids, the solenoids latch to a first position. When a pulse a second polarity is provided to the solenoids, the solenoids latch to a second position. Accordingly, flow through the valve can be controlled through individual pulses from the low-voltage utility control system 412.

Figure 4C:
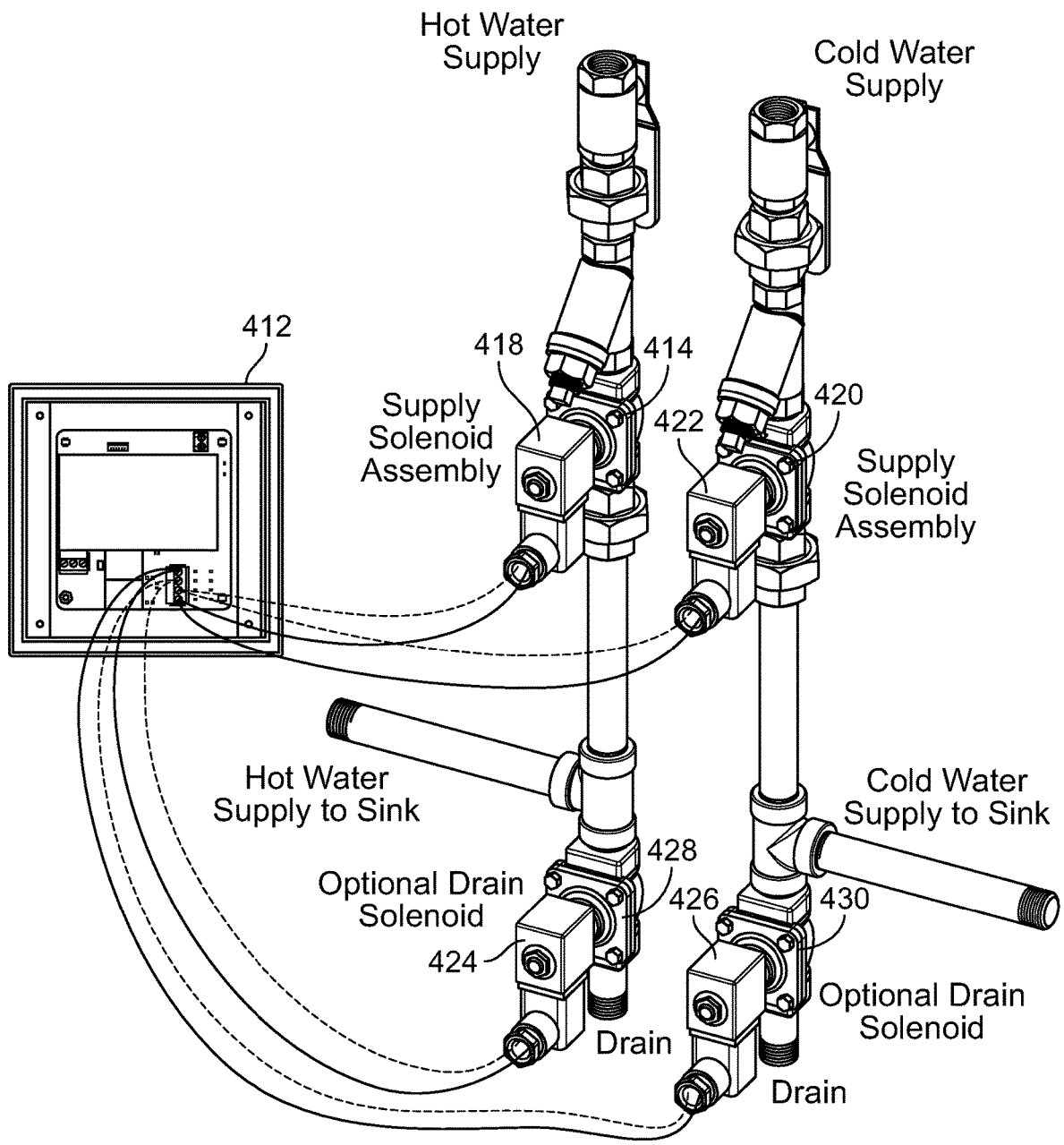
FIG. 4C depicts another example connection configuration for a low-voltage utility control system.

FIG. 4C depicts an example connection configuration for a low-voltage utility control system 412. The connection configuration shown in FIG. 4C shows the control of four solenoids from the low-voltage utility control system 412. The two additional solenoids are for drains. For instance, a first drain valve 428 may also include a first drain solenoid 424 and a second drain valve 430 may include a second drain solenoid 426. Such an implementation allows for a drain valves to open when the water is turned off. Similarly, the implementation allows for the drain valves to close when the water is turned on. Thus, the drain solenoids may be in the opposite state of the other two solenoids that are primarily for control of the flow of water.

Figure 5A:
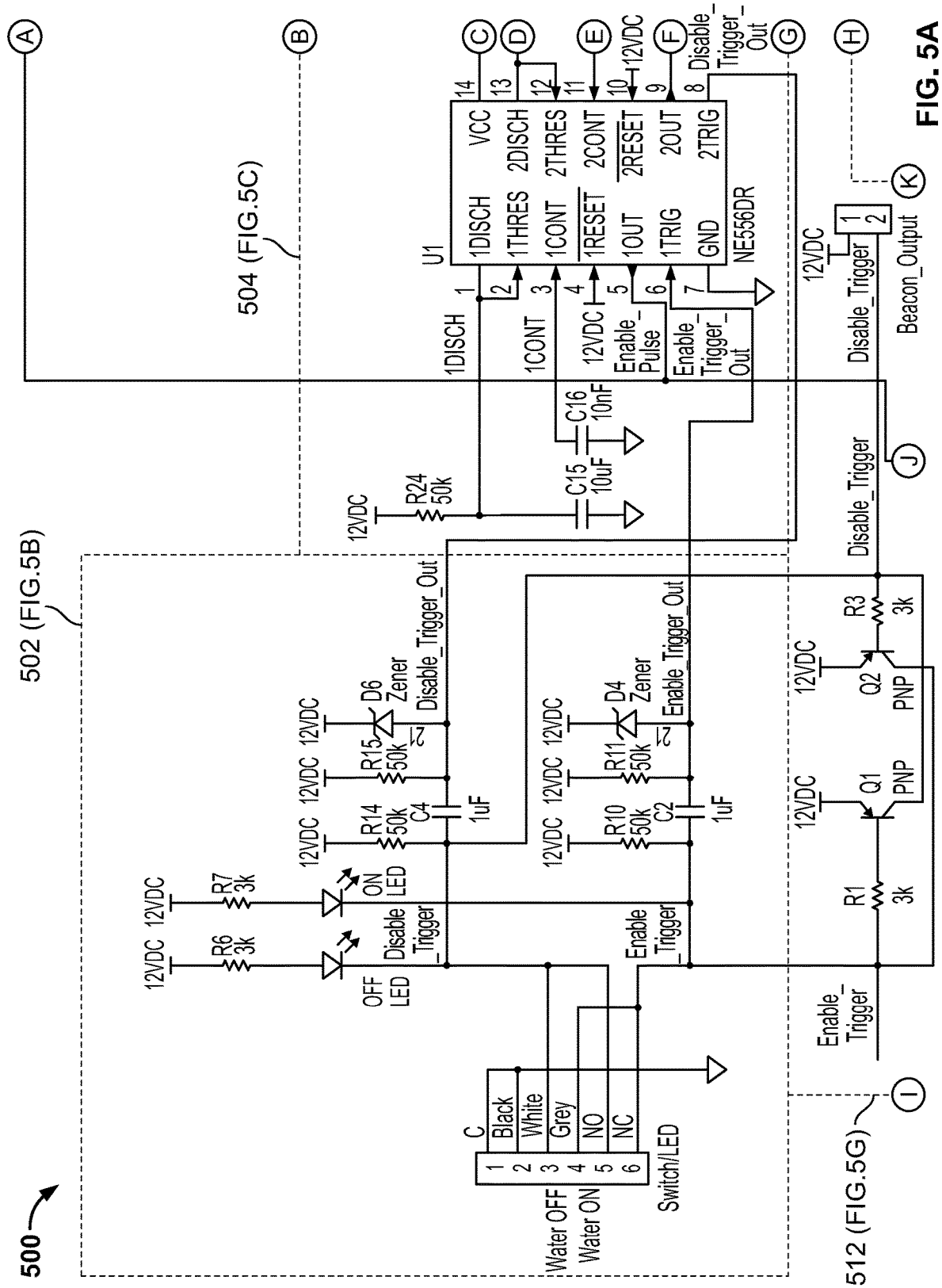
FIG. 5A depicts an example circuit diagram for low-voltage control circuitry of a low-voltage utility control system.
Figure 5A:
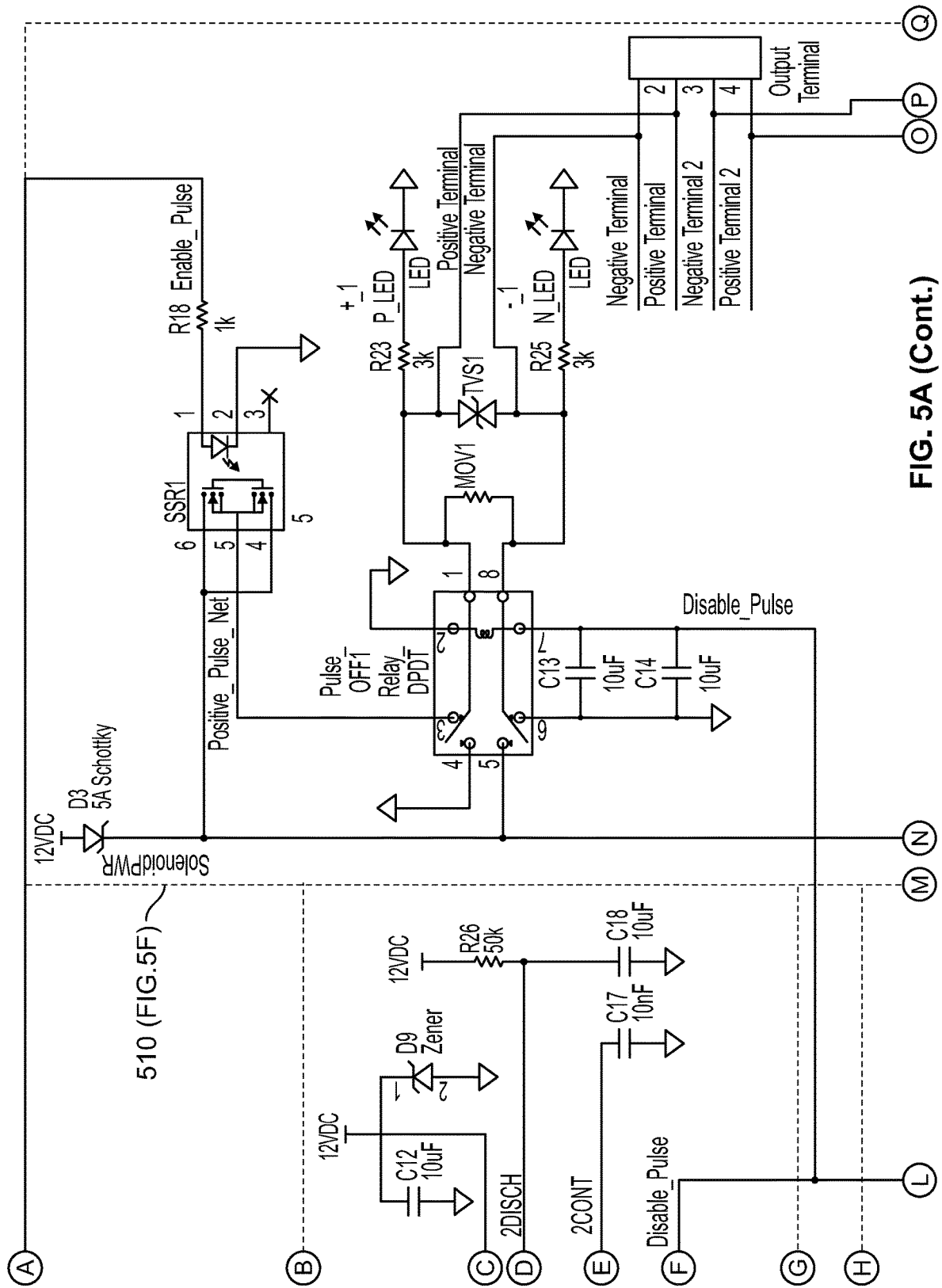
Figure 5A:
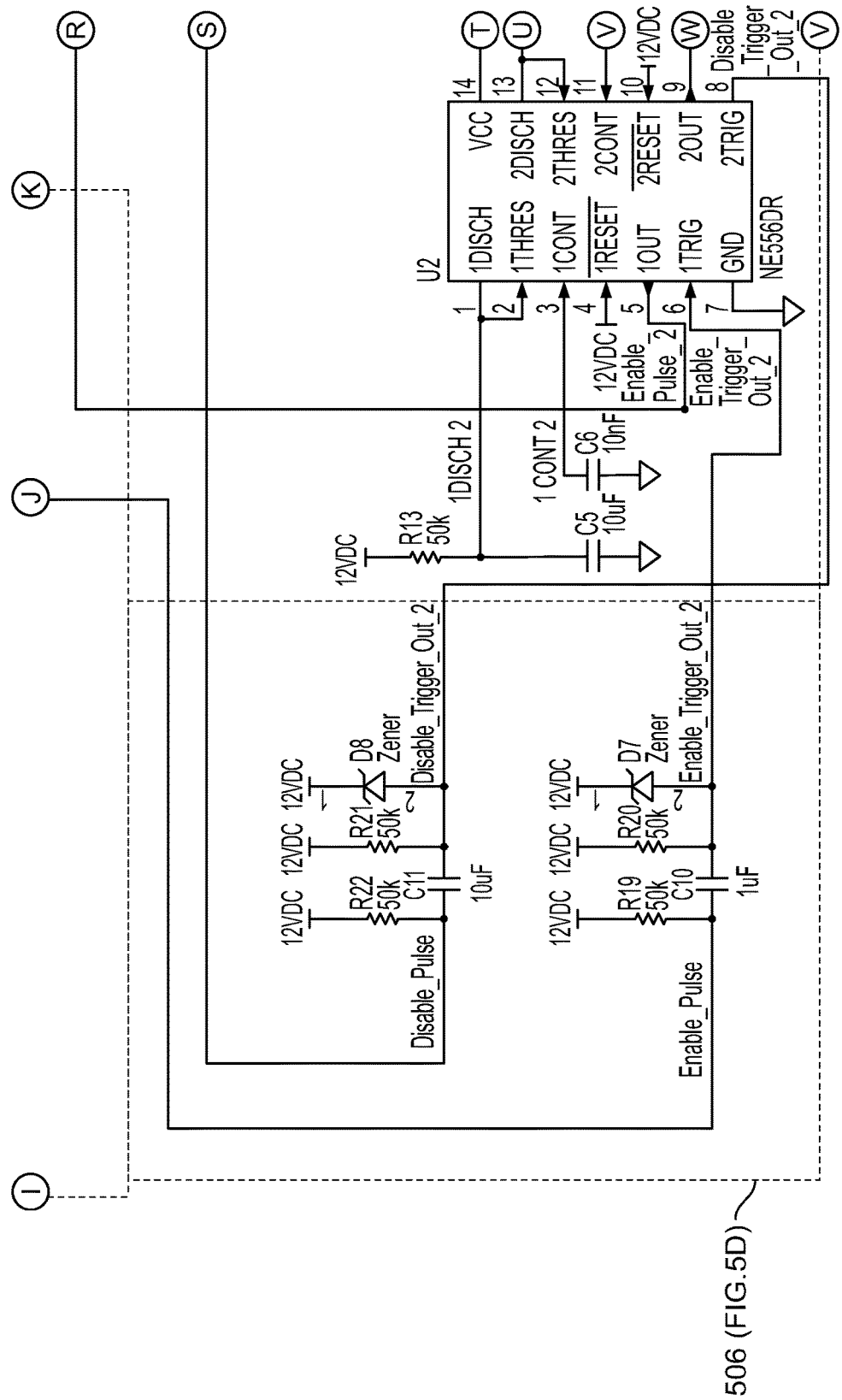
Figure 5A:
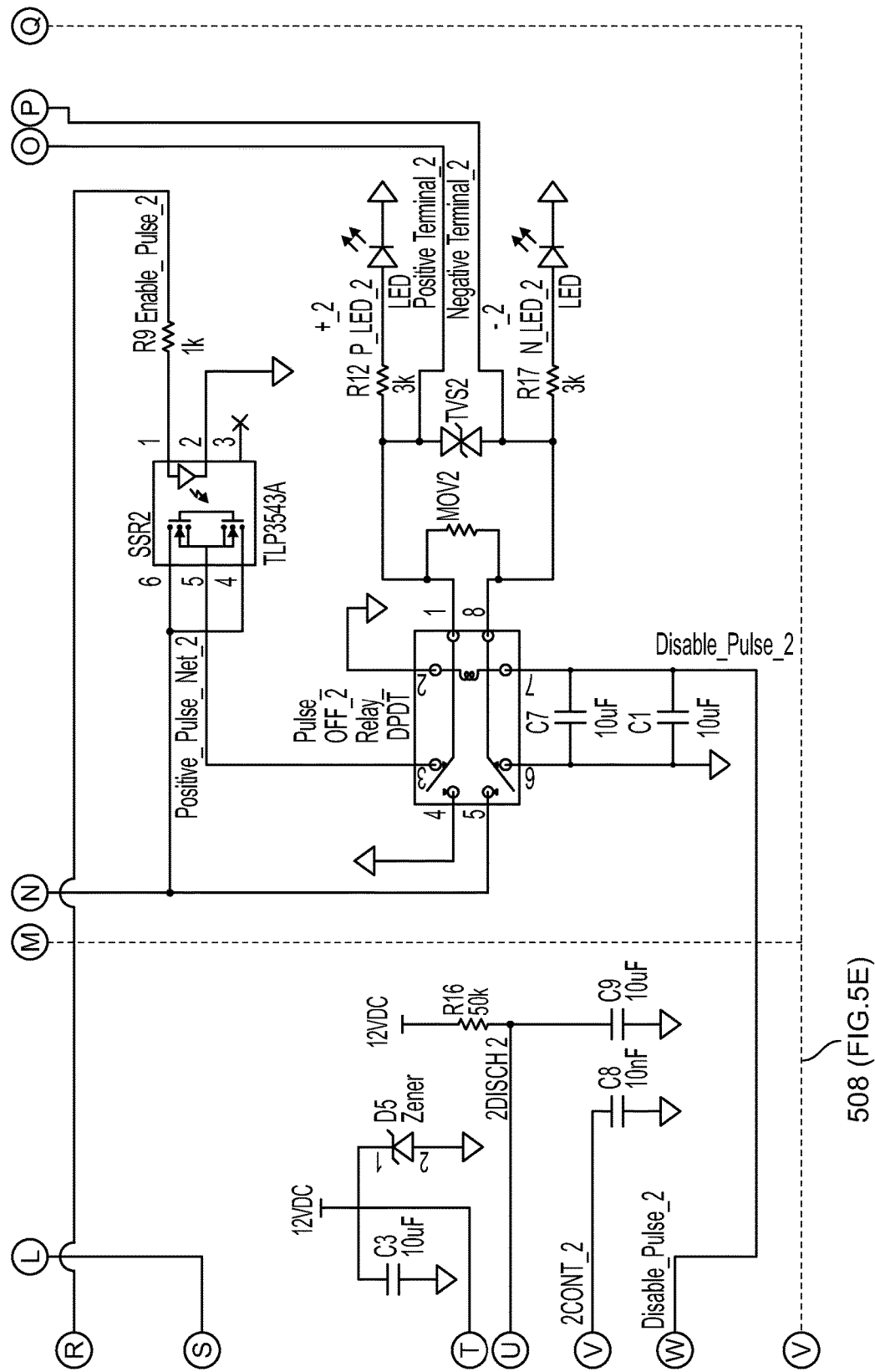

FIG. 5A depicts an example circuit diagram for low-voltage control circuitry 500 of a low-voltage utility control system. In general, the low-voltage control circuitry 500 includes cascading timer integrated circuits for generating control pulses to latching solenoids. The use of cascading timers allows for control of additional solenoids while efficiently working within current and power constraints a power supply. The use of cascading timers also helps in reducing voltage drop of the signal as more solenoids are desired to be controlled. The example configuration also allows for the low-voltage control circuitry 500 able to operate on the same 12 VDC voltage as well. Polarity of the control pulses is controlled through the use of relays such that a positive pulse may be used to latch the solenoid in a first state (such as open) and a negative pulse may be used to latch the solenoid in a second state (such as closed), despite the entire low-voltage control circuitry 500 operating from +12 VDC voltage.

The low-voltage control circuitry 500 includes a plurality of sub-sections identified by the dashed boxes. Each of the sub-sections are shown enlarged in the respective figures shown in parentheticals next to the reference numerals in FIG. 5A. For example, the low-voltage control circuitry 500 includes a switch and indicator subsection 502 (enlarged in FIG. 5B), a first pulse generation subsection 504 (enlarged in FIG. 5C), a pulse conditioning subsection 506 (enlarged in FIG. 5D), a second pulse generation subsection 508 (enlarged in FIG. 5E), a pulse output subsection 510 (enlarged in FIG. 5F), and a multi-switch control subsection 512 (enlarged in FIG. 5G). FIGS. 5A-5G are discussed concurrently. The low-voltage circuitry 500 operates on a low-voltage, and in the particular example depicted that low voltage value is 12 VDC.

The switch and indicator subsection 502 includes an input plug for receiving connections from a switch, such as the switches described above and depicted in FIGS. 1A-1B. When the switch is turned from one state to another (e.g., Water ON to Water OFF), either an enable trigger signal or a disable trigger is generated. The enable trigger is generated to ultimately cause a latching solenoid to latch in a first state, and the disable trigger is generated to ultimately cause a solenoid to latch in a second as discussed further herein. As an example, when the switch is turned to Water ON, a pulse is generated to latch the solenoid in a state that allows for water to flow through the valve. The enable trigger signal and disable trigger signal are both ground signals that are generated from turning the switch, but to different positions. For instance, in the example depicted, when the switch is turned to water ON, the voltage on normally closed (NC) line goes to ground, which ultimately causes a ground pulse as discussed below.

The enable trigger is generated on a first wire that is connected to a first RC filter including resistors R10, R11 and capacitor C2. The values of the resistors R10, R11 and capacitor C2 control the duration of the ground pulse of the enable trigger signal. The value of the resistor R11 affects the recharge rate for the capacitor C2. The disable trigger signal is generated on a second wire that is connected to a second RC filter includes resistors R14, R15 and capacitor C4. The values of the resistors R14, R15 and capacitor C4 control the duration of the ground pulse of the disable trigger. The value of the resistor R15 affects the recharge rate of the capacitor C4. While the term "wires" is used herein, the wire may be a trace of a printed circuit board (PCB) or other conductive element for connecting electrical components. In some examples, the resistance and capacitance values of the first RC filter and the second RC filter may be the same. A diode, such as a Zener diode, may also be included following each of the RC filters to help regulate voltage and help prevent overvoltage. For example, the diode D4 and resistor R11 may follow the first RC filter, and the diode D6 and resistor R15 may follow the second RC filter. The output of the first RC filter is referred to as the enable trigger out signal is provided to the first pulse generation subsection 504. The output of the second RC filter is referred to the disable trigger out signal and is also provided to the first pulse generation subsection 504. In other examples, the first RC filter and the second RC filter may be replaced with other pulse generating mechanisms or circuitry, such as a monostable multi-vibrator(s).

Figure 5B:
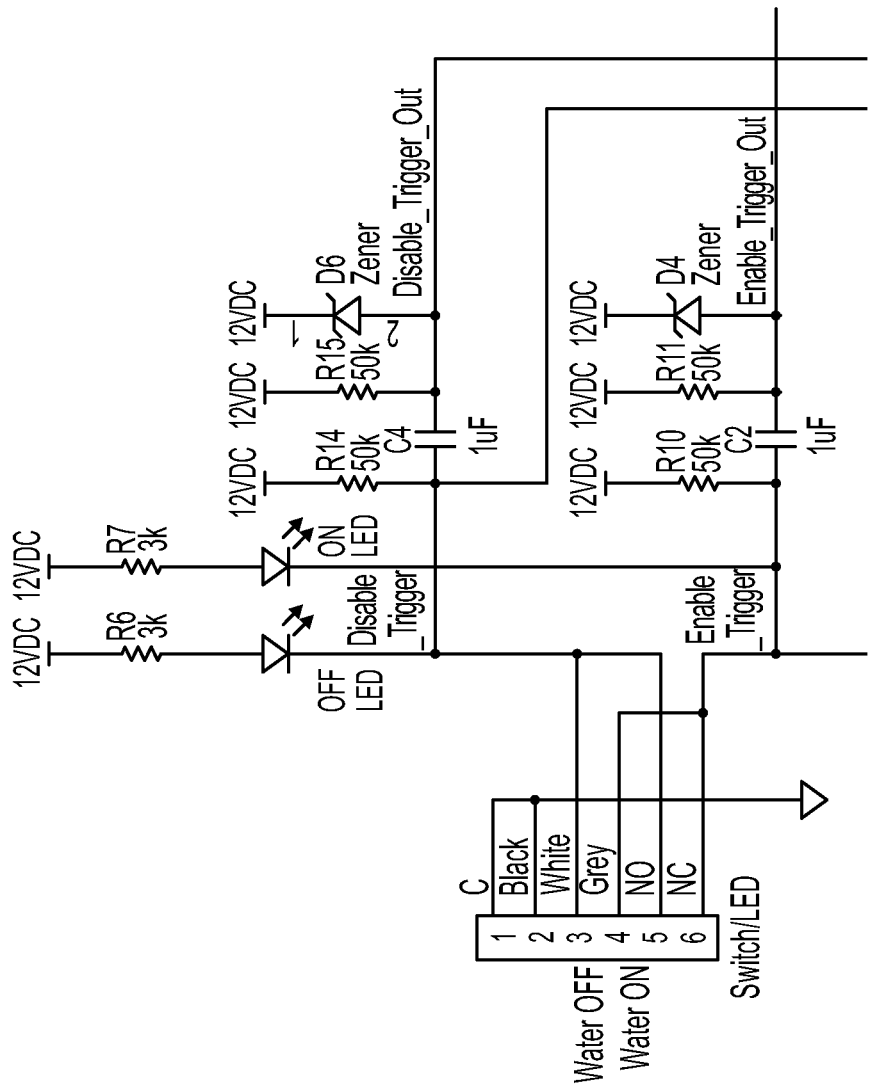
FIG. 5B depicts a switch and indicator subsection of the low-voltage control circuitry of FIG. 5A.
Figure 5C:
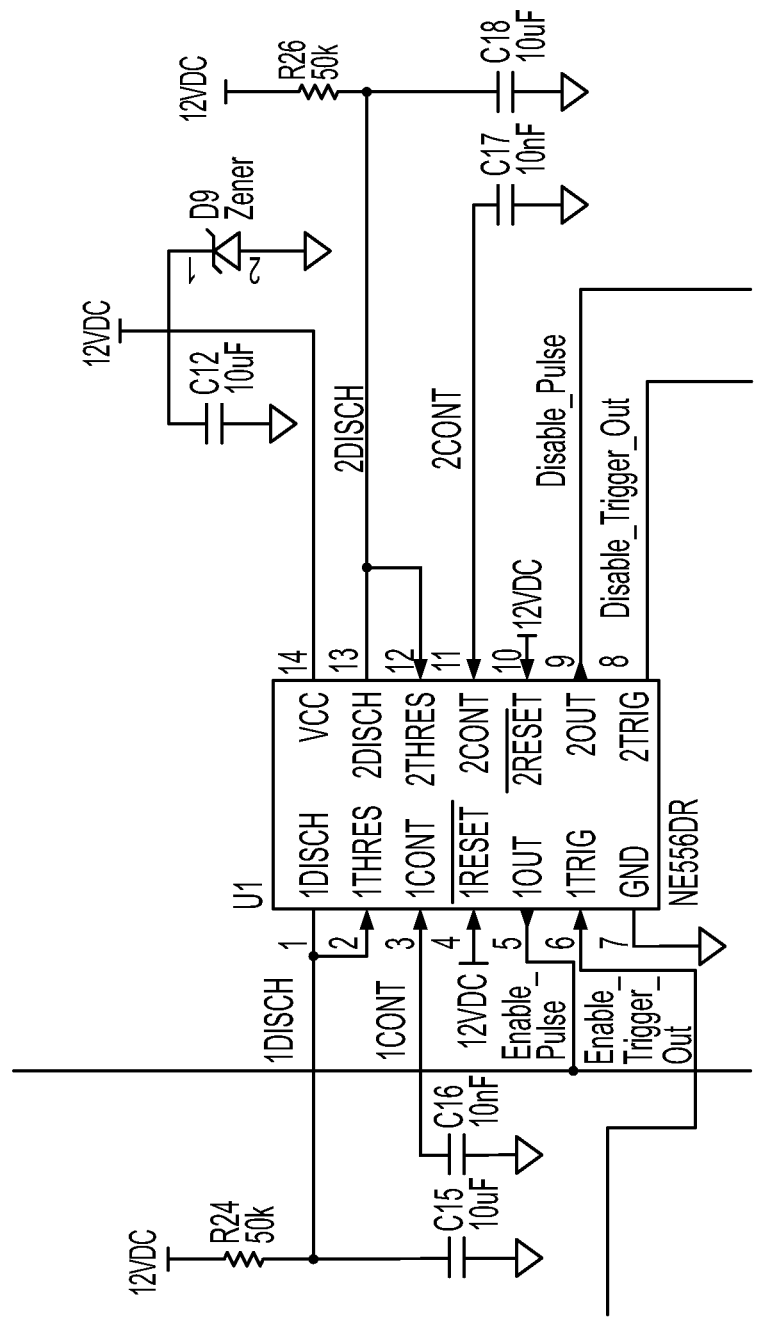
FIG. 5C depicts first pulse generation subsection of the low-voltage control circuitry of FIG. 5A.
Figure 5D:
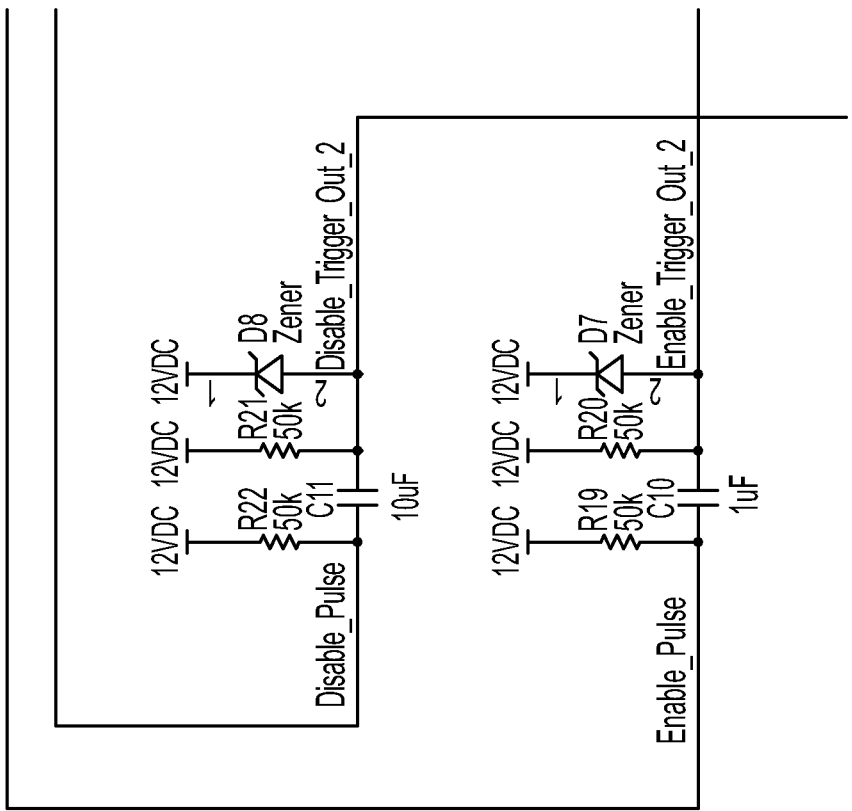
FIG. 5D depicts a pulse conditioning subsection of the low-voltage control circuitry of FIG. 5A.
Figure 5E:
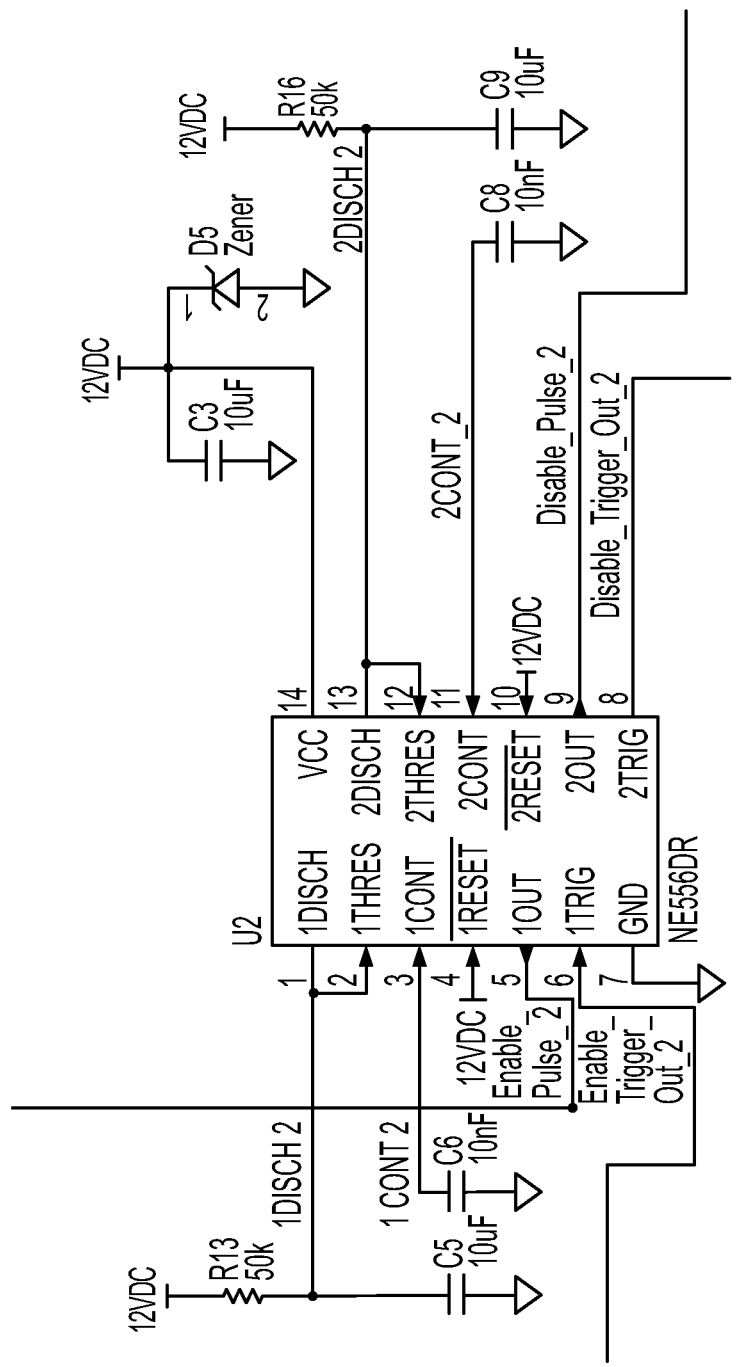
FIG. 5E depicts a second pulse generation subsection of the low-voltage control circuitry of FIG. 5A.
Figure 5F:
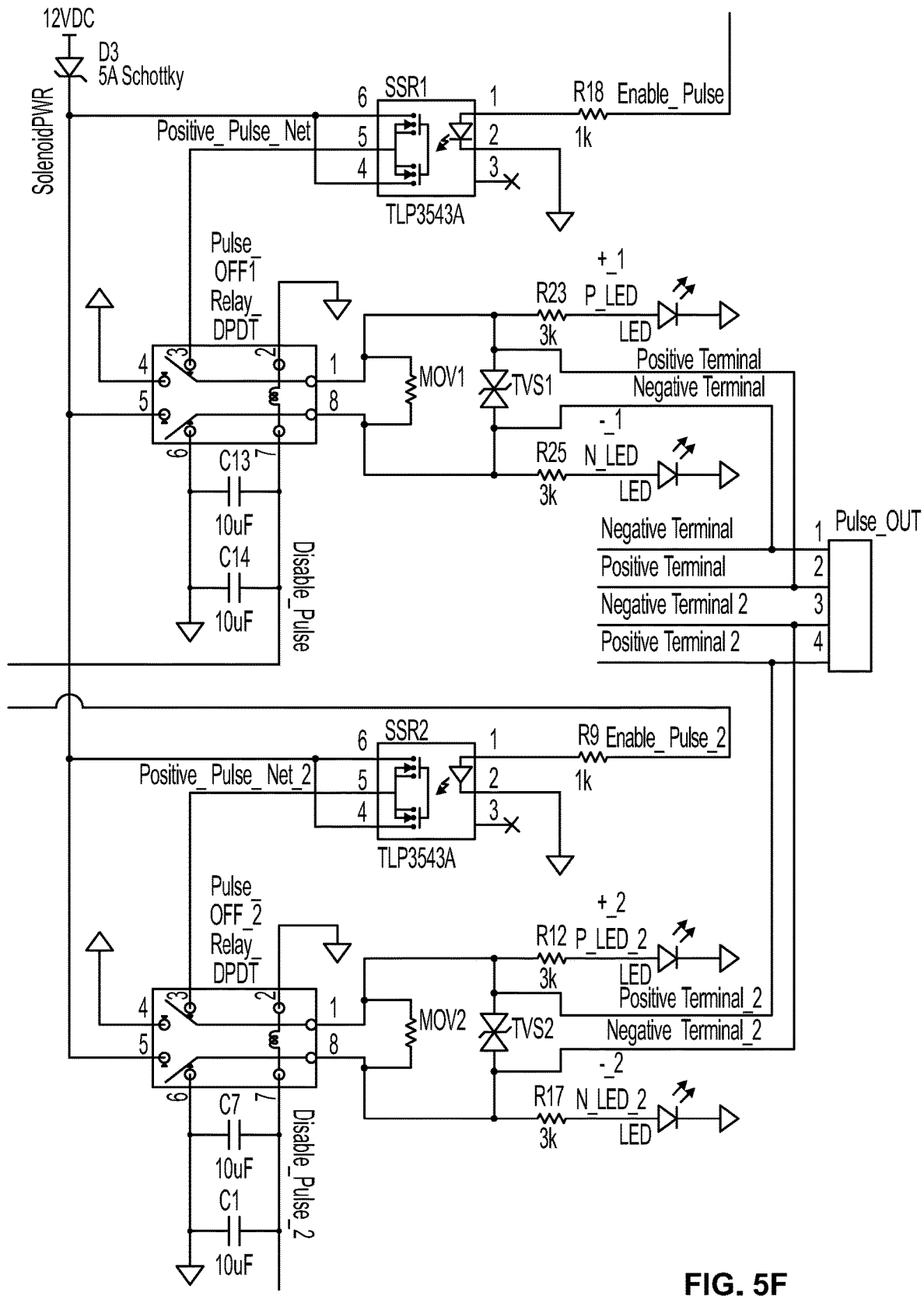
FIG. 5F depicts a pulse output subsection of the low-voltage control circuitry of FIG. 5A.
Figure 5G:
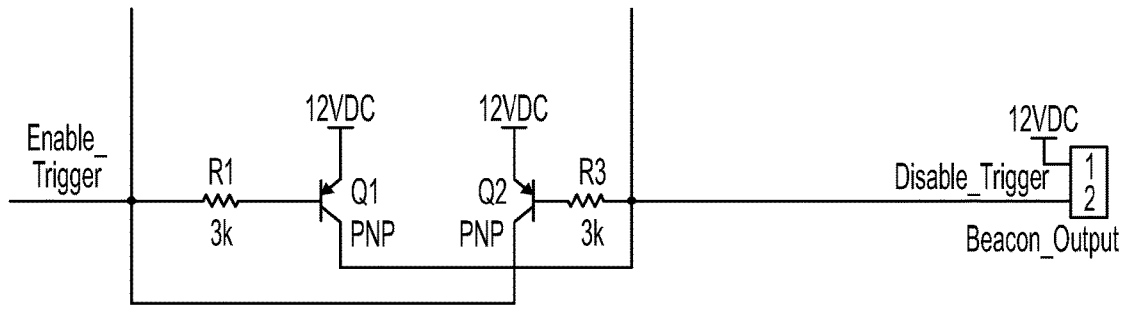
FIG. 5G depicts a multi-switch control subsection of the low-voltage control circuitry of FIG. 5A.

The switch and indicator subsection 502 may also include two indicator LEDs, such as the On LED and the Off LED depicted in FIGS. 5A and 5B. The indicator LEDs indicate whether the utility control system is in an on state or an off state. The LEDs activate based on the position of the switch. For instance, when the switch is in one state, one of the LEDs will be connected to ground allowing for current to flow across the LED. When the switch is in the other state, the other LED will be connected to ground allowing for current to flow across the other LED. Accordingly, the appropriate LED will be illuminated based on the state of the switch.

The first pulse generation subsection 504 includes a timer integrated circuit U1, which may be a 555 timer or combination package of multiple 555 types of timers such as a NE556DR from Texas Instruments, which is depicted in the example in low-voltage circuitry 500. The timer U1 may be configured in a monostable mode. The timer U1 may include a first trigger operatively tied to a first output and a second trigger operatively tied to a second output. When a respective trigger is activated, a pulse is generated from the respective output.

The enable trigger out signal is provided from the switch and indicator subsection 502 to a first trigger input (pin 6 as depicted) of the timer U1 and the disable trigger out signal is provided from the switch and indicator subsection 502 to a second trigger input (pin 8 as depicted) of the timer U1. Accordingly, when the enable trigger out signal is present (e.g., a ground pulse) at the first trigger input, a portion of the timer U1 is triggered and an enable pulse is generated from the first output (pin 5 as depicted) of the timer U1. Similarly, when the disable trigger out signal is present (e.g., a ground pulse) at the second input trigger, a disable pulse is generated from the second output (depicted as pin 9). The enable pulse and the disable pulse are provided to the pulse conditioning subsection 506 and the pulse output subsection 510. The enable pulse may be a positive 12 VDC pulse and the disable pulse may be a positive 12 VDC pulse. The remainder of the pins of the timer U1 may be wired as depicted. The length of the enable pulse and the disable pulses may be altered by changing the resistance values of the resistors and capacitors connected to the other pins of the timer U1, such as resistor R24 and capacitor C15 connected to the first discharge pin (depicted as pin 1) and the resistor R26 and capacitor C18 connected to the second discharge pin (depicted as pin 13).

The pulse conditioning subsection 506 includes a first RC filter and a second RC filter. The first RC filter is for the enable pulse and includes resistors R19, R20 and capacitor C10. The output of the first RC filter is referred to as the enable trigger out 2 and is provided to the second pulse generation subsection 508. The enable trigger out 2 signal includes a ground pulse. The values of the resistors R19, R20 and the capacitor C10 control the duration of the pulse in the enable trigger out 2 signal. The value of the resistor R20 affects the recharge rate of the capacitor C10. The circuitry may also include a diode D7 to regulate voltage.

The second RC filter is for the disable pulse and includes resistors R22, R21 and capacitor C11. The output of the second RC filter is referred to as the disable trigger out 2 and is provided to the second pulse generation subsection 508. The disable trigger out 2 signal includes a ground pulse. The values of the resistors R22, R21 and the capacitor C11 control the duration of the pulse in the disable trigger out 2 signal. The value of the resistor R21 affects the recharge rate of the capacitor C10. The capacitance value of the capacitor C11 may be greater than the capacitance value of C10. The result is that the disable trigger out 2 pulse is longer than the enable trigger out 2 pulse. Such a configuration may be desired where the disable trigger out 2 pulse takes precedence over the enable trigger out 2 pulse. Increasing the pulse length also helps ensure that noise in the system does not obfuscate the intended pulse signal. The circuitry may also include an additional resistor R21 and a diode D8 to regulate voltage. In other examples, the first RC filter and the second RC filter may be replaced with other pulse generating mechanisms or circuitry, such as a monostable multivibrator(s).

The second pulse generation subsection 508 includes another timer U2. The timer U2 may be the same type of timer as timer U1 in the first pulse generation subsection 504. The timer U2 may also be wired similarly to the timer U1 and function in a similar manner. For instance, the enable trigger out 2 signal is provided to a first trigger input (pin 6 as depicted) of the timer U2 and the disable trigger out 2 signal is provided to a second trigger input (pin 8 as depicted) of the timer U2. Accordingly, when the enable trigger out signal 2 is present (e.g., a ground pulse) at the first trigger input, a portion of the timer U2 is triggered and an enable pulse 2 is generated from the first output (pin 5 as depicted) of the timer U2. Similarly, when the disable trigger out 2 signal is present (e.g., a ground pulse) at the second input trigger, a disable pulse 2 is generated from the second output (depicted as pin 9) of the timer U2. The enable pulse 2 and the disable pulse 2 are provided to the pulse output subsection 510. The remainder of the pins of the timer U2 may be wired as depicted. The length of the enable pulse and the disable pulse may be altered by changing the resistance values of the resistors and capacitors connected to the other pins of the timer U2, such as resistor R13 and capacitor C5 connected to the first discharge pin (depicted as pin 1) and the resistor R16 and capacitor C9 connected to the second discharge pin (depicted as pin 13).

In other examples, the enable pulse 2 and the disable pulse 2 may be provided to another pulse conditioning subsection (not depicted) for use in a third pulse generation subsection (not depicted). Just as the second timer U2 was added in a cascading manner to the first timer U1, additional timers may be added to the low-voltage control circuitry 500 to allow for additional solenoids to be controlled. In some examples, the low-voltage control circuitry 500 may include additional terminal blocks or connectors to attach such additional circuitry to allow for ease of expansion.

The pulse output subsection 510 includes a first solid-state relay SSR1 and a first mechanical relay Pulse_OFF1 for generating control pulses that are output to a first pair of terminals in the output terminal. The pulse output subsection 510 also includes a second solid-state relay SSR2 and a second mechanical relay Pulse_OFF2. While described as solid-state and mechanical relays in the present example, each relay described may either be mechanical or solid state. For instance, in other examples, all the relays may be solid-state relays. The primary purpose of the mechanical relays in the pulse output subsection 510 is to control polarity to provide an opposite or negative polarity that latches the respective solenoid in a second state, which may be an opposite state from the first state. For example, the first state may be an open state (e.g., allowing water to flow) and the second state may be a closed state (e.g., preventing water from flowing). The primary purpose of the solid-state relays in the pulse output subsection 510 is to provide a positive pulse and power to the solenoids via the output terminal.

More specifically, the first solid-state relay SSR1 has a 12 VDC input voltage from the same power supply that supplies the remainder of the low-voltage control circuitry 500. The first solid-state relay SSR1 may be a normally opened relay. The enable pulse signal from the first pulse generation subsection 504 may be connected to the anode (depicted as pin 1) of the first solid-state relay SSR1 and the cathode of the relay (depicted as pin 2) may be connected to ground. An appropriate resistor R18 may also be connected to the anode to limit current. The drain (depicted as pin 4) and the source (depicted as pin 5) may be connected to the 12 VDC power. When an enable pulse is present on the anode, the first solid-state relay SSR1 outputs a positive pulse, referred to as positive pulse net, from the source (depicted as pin 5). The positive pulse net is provided to the first mechanical relay Pulse_OFF1.

The first mechanical relay Pulse_OFF1 may be a double-pole-double-throw (DPDT) relay. When there is no voltage difference applied across the coil (e.g., no voltage across pins 7 and 2), then pin 3 and pin 1 are connected. Accordingly, the positive pulse net is communicated through the first mechanical relay to the positive terminal in such a condition. In addition, in such a condition, pin 8 is connected to pin 6, which is connected to ground. Pin 8 of the first mechanical relay Pulse_OFF1 is connected to the negative terminal of the output terminal. Thus, there is a positive voltage difference between the positive terminal and the negative terminal for the duration of the positive pulse net. When the positive pulse net reaches a solenoid, it causes the solenoid to latch to a first state by allowing for current to flow across the solenoid in a first direction.

In contrast, when a voltage difference is applied across the coil of the mechanical relay, then current flows from pin 5 to pin 8. Thus, when the disable pulse is present at pin 7, pins 5 and 8 are connected and pins 4 and 1 are connected. Accordingly, for the duration of the disable pulse, a 12 VDC is present on the negative terminal and the positive terminal is at ground. Therefore, the voltage difference across the positive and negative terminal when the disable pulse is present is opposite that of the voltage difference when the enable pulse is present. That is, the polarity of the pulse is effectively opposite. When the disable pulse reaches the solenoid, it causes the solenoid to latch to a second state based on the opposite polarity of the pulse. For example, the opposite polarity of the pulse may cause current to flow across the solenoid in a second direction that is opposite the first direction. If the negative and positive terminals are attached to the solenoid in an opposite manner, switching of the key will provide the opposite effects. In addition, due to the configuration of the first mechanical relay, a disable pulse overrides an enable pulse if both pulses are present at the first mechanical relay at the same time.

Additional circuitry may also be provided in the pulse output subsection 510 to alleviate issues related to noise in the circuit and potential over-current and/or over-voltage conditions. For instance, when the output terminals are connected to the solenoids, the large inductance of the solenoids creates unwanted noise within the circuit. Accordingly, a transient voltage suppressor TVS1 may be incorporated and placed between the positive terminal and the negative terminal. A diode D3 may also be placed on the solenoid power line. The diode D3 may be a Schottky diode. A varistor MOV1 may also be included and connected to the positive terminal and the negative terminal. In other examples, at least some of the relays in the pulse output subsection 510 may be replaced by an H-Bridge circuit.

LEDs may also be included to indicate which type of pulse is active. For example, an LED may be connected to the positive terminal as shown in the figures. The LED illuminates when a positive pulse net is present. Another LED may be connected to the negative terminal. That LED illuminates when the disable pulse is present. Thus, a user may be able to visually inspect the circuit to determine when each of the pulses are being delivered to the solenoid(s).

The second solid-state relay SSR2 and the second mechanical relay Pulse_OFF2 work in substantially the same manner as the first solid-state relay SSR1 and the first mechanical relay Pulse_OFF1 but operate on enable pulse 2 and disable pulse 2. The second relays are also connected to a second pair of output terminals, which allows for control of additional solenoids.

Wiring from the output terminals to the solenoids may be accomplished with various sizes of wiring. As an example, an 18-gauge wire may be used and provides suitable performance even at a length of 700 feet. If needed, larger distances may be accomplished through the use of larger gauge wire. As discussed above, because the voltage on the output terminals is low (e.g., 12 VDC) there is little risk in running the low-voltage wiring through building structures such as walls. Upon a power outage, a ground pulse may also be generated that causes the solenoid to latch in a particular state. For instance, the ground pulse generated on a power outage may cause the solenoid to latch to the second state. Upon power resuming, a pulse may be generated that causes the solenoid to latch in the first state. Accordingly, in some examples, a power outage may cause the solenoid to latch in an opposite state from the operating state and power resumption causes the solenoid The low-voltage control circuitry 500 may also include multi-switch control subsection 512. The multi-switch control subsection 512 includes a first transistor Q1 and a second transistor Q2. The first transistor Q1 may be a PNP transistor and the second transistor Q2 may also be a PNP transistor. The use of the transistors allows for multiple types of switches, such as a key switch or a button switch, to be used to control the utility and still power the ON and OFF LEDs as well as a beacon. For example, when disable trigger is present (e.g., ground pulse) a voltage difference exists between the two terminals of the beacon output to allow for the beacon to be powered. The use of the transistors allows for a common output (such as the switch plug 209) connector to be used for connecting different types of switches. For instance, a key switch and a push-button switch may be connected via the same connector and the ON and OFF LEDs still illuminate for the proper positions of the various switches.

Figure 5H:
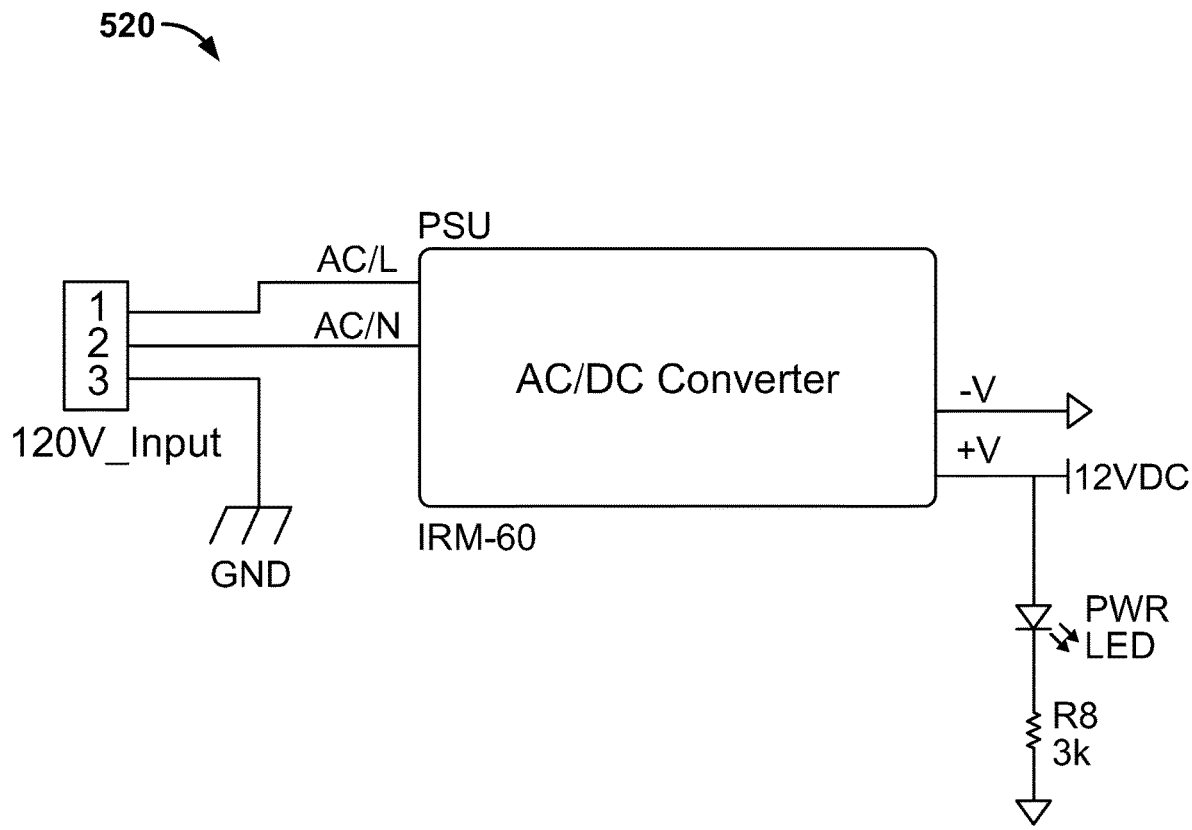
FIG. 5H depicts a power supply for supplying power to the low-voltage circuitry of FIG. 5A.

FIG. 5H depicts a power supply circuit 520 for supplying power to the low-voltage circuitry of FIG. 5A. The power supply circuit 520 includes an AC/DC converter which converts high-voltage AC power to low-voltage DC power. The AC/DC converter receives as input the high-voltage AC power, such as any voltage between 100-240 VAC at 50-60 Hz. The high voltage input may be provided via the input terminal 204 described above and depicted in FIG. 2B. The output is then a 12 VDC power that may be used to power the low-voltage control circuitry 500 and the solenoids. An LED that indicates whether power is being output from the AC/DC converter may also be incorporated.

FIG. 5I depicts tables showing example circuit component values of the low-voltage circuitry of FIG. 5A. For example, the tables indicate in row 13 of each table properties of respective examples for resistors R1, R3, R6, R7, R8, R12, R17, R23, and R25 depicted in the circuit diagrams of FIGS. 5A-5I above. In that example, those resistors are from the Yageo Corporation of Taiwan, correspond to part number RC0603FR-073KL, and have a value of 3 k Ohms. The examples provided in the tables depicted in FIG. 5I are merely provided for an implementation example, and the technology described herein is not limited to such components.

While the examples discussed herein are primarily discussed as controlling water, the examples may also be used for controlling another utility such as gas. The present technology may also be used to control any fluid or gas where the flow can be controlled with a valve.

Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A utility control system comprising:
a switch control unit for selectively controlling a utility, wherein the switch control unit is configured to electrically control a valve for controlling a state of the utility, and wherein the switch control unit includes:
switch selection mechanism for selectively controlling when a utility is in an on state and an off state; and
a visual indicator, wherein the visual indicator is configured to illuminate a first color when the switch selection mechanism is in a first position to indicate the on state of the utility and an open limit switch signal is received from the valve, illuminate a second color when the switch selection mechanism is in a second position to indicate the off state of the utility and a closed limit switch signal is received from the valve, and illuminate an error indication when the switch selection mechanism is in the second position and the closed limit switch signal has not been received from the valve prior to expiration of a close time delay.

2. The system of claim 1, wherein the utility is one of water or gas.

3. The system of claim 1, wherein the visual indicator is a ring and is concentric with the switch selection mechanism.

4. The system of claim 1, wherein the first color is green and the second color is red.

5. The system of claim 1, wherein the visual indicator is further configured to illuminate an opening indication when the valve is moving from a closed position to an open position.

6. The system of claim 1, wherein the visual indicator is further configured to illuminate a closing indication when the valve is moving from an open position to a closed position.

7. The system of claim 1, wherein the visual indicator is further configured to illuminate the error indication when the switch selection mechanism is in the first position and the open limit switch signal is not received from the valve prior to expiration of an open time delay.

8. The system of claim 1, wherein the utility control system is part of a retrofitting kit including predrilled holes corresponding to at least one of a single-gang box or a multi-gang box.

9. The system of claim 8, wherein the utility control system includes a high-voltage input and a low-voltage output, wherein the low-voltage output is configured to be connected to a valve.

10. A utility control system comprising:
a switch control unit for selectively controlling a utility, the switch control unit including:
a switch selection mechanism for selectively controlling when a utility is in an on state and an off state; and
a visual indicator, wherein the visual indicator is configured to illuminate different colors; and
control circuitry configured to:
send signals to a valve to electrically control the state of the utility;
receive signals from the valve;
cause the visual indicator to illuminate a first color when the switch selection mechanism is in a first position to indicate the on state of the utility and an open limit switch signal is received from the valve;
cause the visual indicator to illuminate a second color when the switch selection mechanism is in a second position to indicate the off state of the utility and a closed limit switch signal is received from the valve; and
cause the visual indicator to illuminate an error indication, following expiration of a close time delay, when the switch selection mechanism is in the second position and the closed limit switch signal is not received from the valve.

11. The utility control system of claim 10, wherein the visual indicator is a ring and is concentric with the switch selection mechanism.

12. The utility control system of claim 11, wherein the switch selection mechanism is a key.

13. The utility control system of claim 10, wherein the control circuitry is further configured to cause the visual indicator to display, during an open time delay, an opening indication when the switch selection mechanism is in the first position and the open limit switch signal has not been received.

14. The utility control system of claim 10, wherein the control circuitry is further configured to cause the visual indicator to display, during a close time delay, a closing indication when the switch selection mechanism is in the second position and the closed limit switch signal has not been received.

15. The utility control system of claim 10, wherein the control circuitry is further configured to cause the visual indicator to display, following expiration of an open time delay, an error indication when the switch selection mechanism is in the first position and the open limit switch signal has not been received.

16. The utility control system of claim 10, wherein the error indication is an alternating illumination of the first color and the second color.

17. A method for controlling a utility, the method comprising:
- determining a switch selection mechanism of a utility control system is in a first position to indicate an on state of the utility;
- receiving a first open limit switch signal from a valve of the utility;
- based on both the switch selection mechanism being in the first position and receiving the open limit switch signal, illuminating a visual indicator, of the utility control system, with a first color;
- subsequent to a movement of the switch selection mechanism, determining that the switch selection mechanism is in a second position to indicate an off state of the utility;
- receiving a closed limit switch signal from the valve;
- based on both the switch selection mechanism being in the second position and receiving the closed limit switch signal, illuminating the visual indicator with a second color,
- determining that the switch selection mechanism has been moved back to the first position;
- determining, after determining that the switch selection mechanism has been moved back to the first position, that an open delay period has expired before receiving a second open limit switch signal; and
- based on determining that the open delay period has expired before receiving the second open limit switch signal, causing the visual indicator to illuminate an error condition.

* * * * *